US011350422B2

(12) United States Patent
Furuichi

(10) Patent No.: US 11,350,422 B2
(45) Date of Patent: May 31, 2022

(54) CONTROL DEVICE, WIRELESS DEVICE, METHOD, AND RECORDING MEDIUM

(71) Applicant: Sony Corporation, Tokyo (JP)

(72) Inventor: Sho Furuichi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 39 days.

(21) Appl. No.: 16/634,579

(22) PCT Filed: May 9, 2018

(86) PCT No.: PCT/JP2018/017857
§ 371 (c)(1),
(2) Date: Jan. 28, 2020

(87) PCT Pub. No.: WO2019/026375
PCT Pub. Date: Feb. 7, 2019

(65) Prior Publication Data

US 2021/0100005 A1 Apr. 1, 2021

(30) Foreign Application Priority Data

Aug. 4, 2017 (JP) ............................ JP2017-151381

(51) Int. Cl.
*H04W 72/08* (2009.01)
*H04W 4/029* (2018.01)
(Continued)

(52) U.S. Cl.
CPC ........ *H04W 72/082* (2013.01); *H04B 7/0456* (2013.01); *H04W 4/029* (2018.02);
(Continued)

(58) Field of Classification Search
CPC ... H04W 16/28; H04W 72/29; H04W 72/046; H04W 72/048; H04W 72/082; H04B 7/0456
(Continued)

(56) References Cited

U.S. PATENT DOCUMENTS 7,620,370 B2 * 11/2009 Barak ................... H04W 16/10 370/480
10,419,948 B1 * 9/2019 Labadie ................. H01Q 3/005
(Continued)

FOREIGN PATENT DOCUMENTS

JP 2014-127792 A 7/2014
JP 2016-019134 A 2/2016
(Continued)

OTHER PUBLICATIONS

International Search Report and Written Opinion dated Jul. 17, 2018 for PCT/JP2018/017857 filed on May 9, 2018, 14 pages including English Translation of the International Search Report.
(Continued)

*Primary Examiner* — CongVan Tran
(74) *Attorney, Agent, or Firm* — Xsensus, LLP

(57) ABSTRACT

A control device includes a first acquiring section; a second acquiring section; a determining section; and a notifying section. The first acquiring section acquires first geolocation information of a datum point for interference calculation of a first wireless operation and calculates or acquires an interference acceptable amount at the datum point. The second acquiring section acquires second geolocation information, first antenna information, and first beam pattern information of a wireless device belonging to a second wireless operation that shares a portion or all of a frequency assigned to the first wireless operation. The first beam pattern information indicates a beam pattern usable by the wireless device. The determining section determines information regarding a beam permitted to the wireless device on the basis of these acquired pieces of information. The notifying section notifies the wireless device of the information regarding the beam permitted to the wireless device.

13 Claims, 11 Drawing Sheets

(51) Int. Cl.
*H04B 7/0456* (2017.01)
*H04W 16/28* (2009.01)
*H04W 72/04* (2009.01)

(52) U.S. Cl.
CPC ......... *H04W 16/28* (2013.01); *H04W 72/046* (2013.01); *H04W 72/048* (2013.01)

(58) Field of Classification Search
USPC .................................................. 370/328, 329
See application file for complete search history.

(56) References Cited

U.S. PATENT DOCUMENTS

| | | | | |
|---|---|---|---|---|
| 2011/0250857 | A1 | 10/2011 | Reial et al. | |
| 2013/0336270 | A1* | 12/2013 | Nagata | H04W 72/082 370/329 |
| 2014/0219235 | A1 | 8/2014 | Kimura et al. | |
| 2014/0348188 | A1* | 11/2014 | Suganuma | H01S 3/2308 372/20 |
| 2016/0353424 | A1* | 12/2016 | Stirling-Gallacher | H04B 7/0626 |
| 2017/0016992 | A1* | 1/2017 | Harrington | G01S 19/14 |
| 2017/0026977 | A1* | 1/2017 | Gaal | H04W 72/0453 |
| 2017/0201864 | A1 | 7/2017 | Furuichi et al. | |

FOREIGN PATENT DOCUMENTS

| | | | |
|---|---|---|---|
| JP | 2016-195363 | A | 11/2016 |
| WO | 2014/136739 | A1 | 9/2014 |
| WO | 2015/190357 | A1 | 12/2015 |
| WO | 2015/125891 | A1 | 3/2017 |

OTHER PUBLICATIONS

"Report and Order and Further Notice of Proposed Rulemaking," Federal Communications Commission, FCC 16-89, Jun. 7, 2019, 278 pages.

Extended European Search Report dated Jun. 22, 2020, issued in corresponding European Patent Application No. 18840291.1, 13 pages.

* cited by examiner

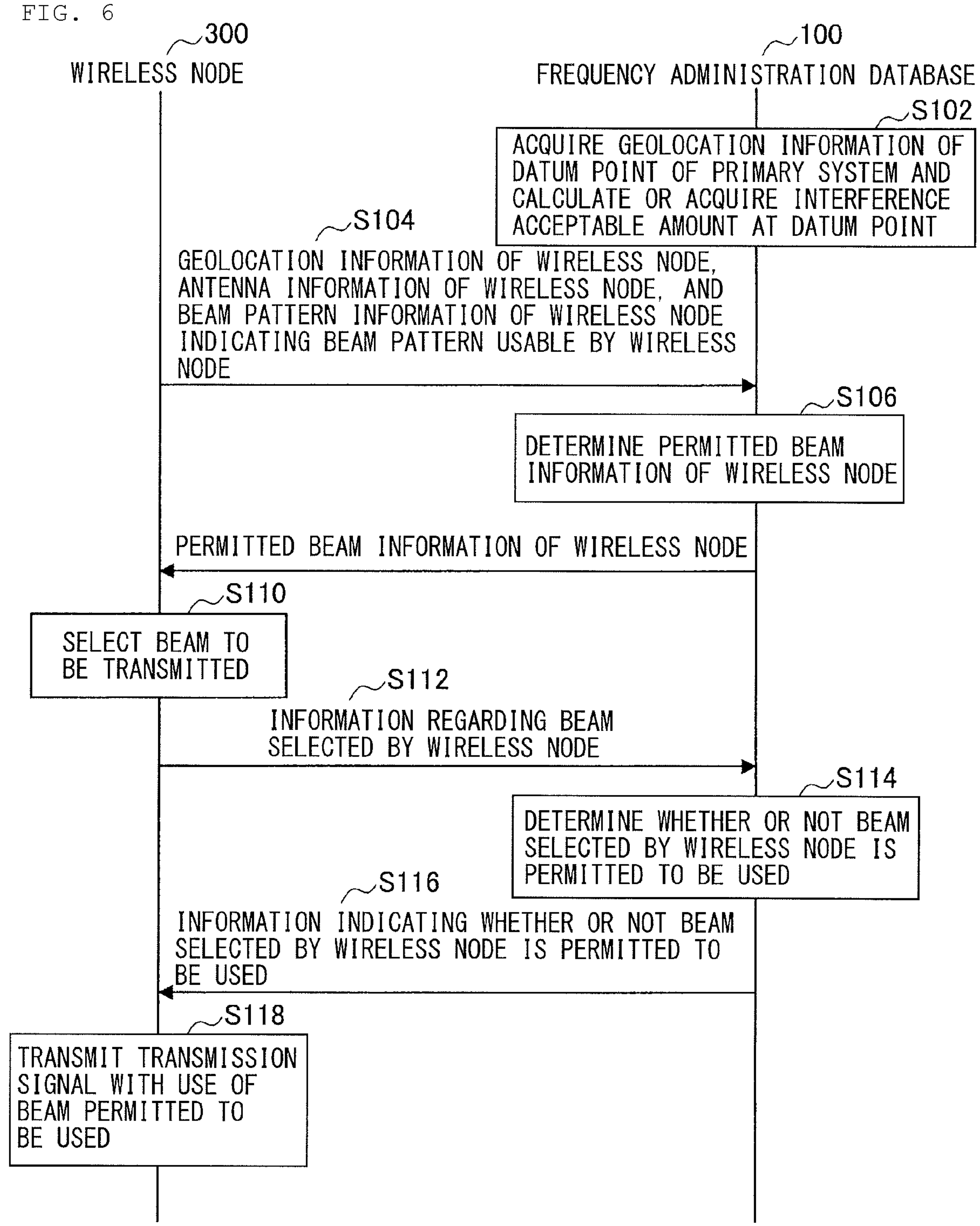
FIG. 6
300
WIRELESS NODE
100
FREQUENCY ADMINISTRATION DATABASE
S102
ACQUIRE GEOLOCATION INFORMATION OF DATUM POINT OF PRIMARY SYSTEM AND CALCULATE OR ACQUIRE INTERFERENCE ACCEPTABLE AMOUNT AT DATUM POINT
S104
GEOLOCATION INFORMATION OF WIRELESS NODE, ANTENNA INFORMATION OF WIRELESS NODE, AND BEAM PATTERN INFORMATION OF WIRELESS NODE INDICATING BEAM PATTERN USABLE BY WIRELESS NODE
S106
DETERMINE PERMITTED BEAM INFORMATION OF WIRELESS NODE
PERMITTED BEAM INFORMATION OF WIRELESS NODE
S110
SELECT BEAM TO BE TRANSMITTED
S112
INFORMATION REGARDING BEAM SELECTED BY WIRELESS NODE
S114
DETERMINE WHETHER OR NOT BEAM SELECTED BY WIRELESS NODE IS PERMITTED TO BE USED
S116
INFORMATION INDICATING WHETHER OR NOT BEAM SELECTED BY WIRELESS NODE IS PERMITTED TO BE USED
S118
TRANSMIT TRANSMISSION SIGNAL WITH USE OF BEAM PERMITTED TO BE USED

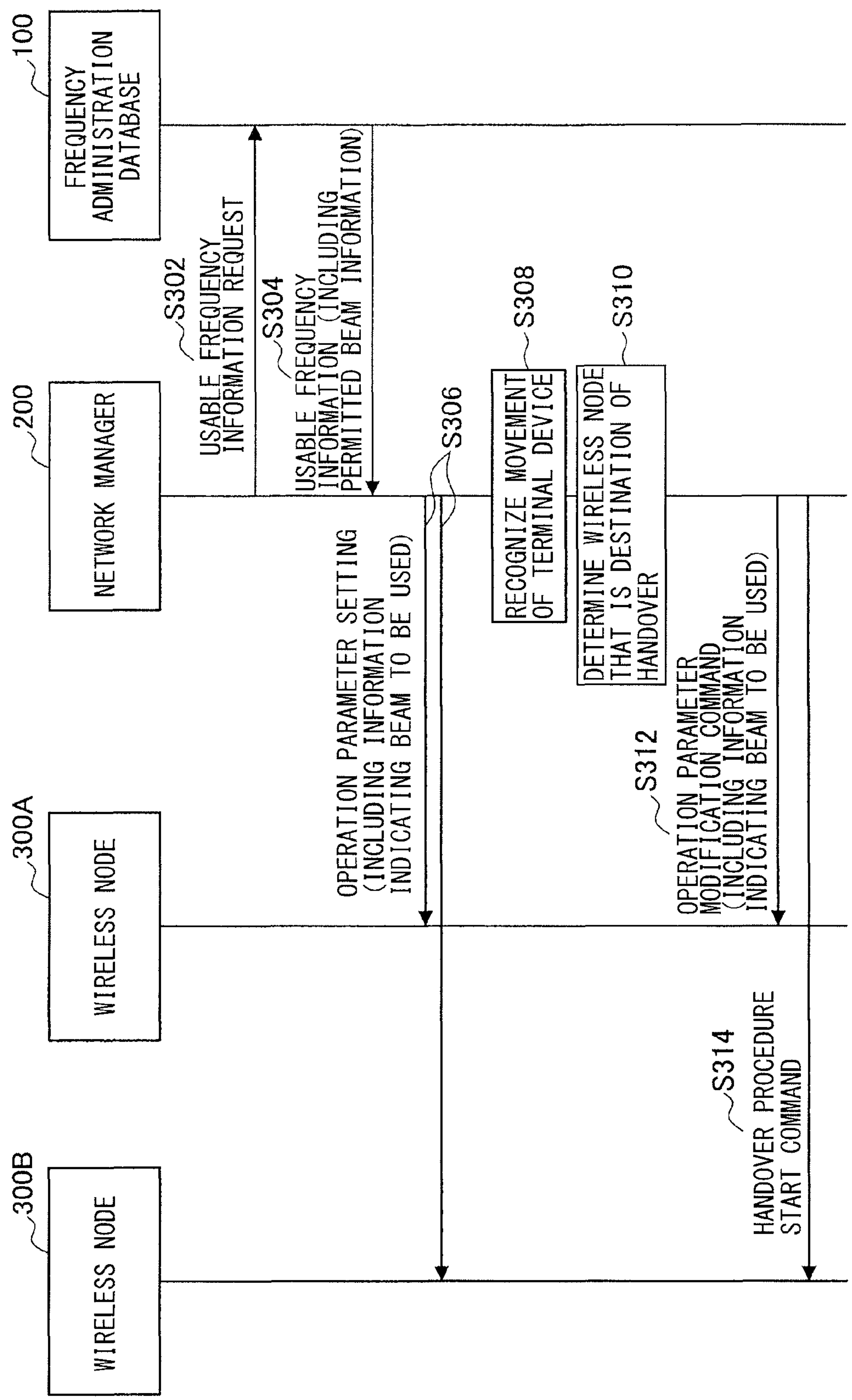
FIG. 10
100
FREQUENCY ADMINISTRATION DATABASE
200
NETWORK MANAGER
300A
WIRELESS NODE
300B
WIRELESS NODE
S302
USABLE FREQUENCY INFORMATION REQUEST
S304
USABLE FREQUENCY INFORMATION (INCLUDING PERMITTED BEAM INFORMATION)
S306
OPERATION PARAMETER SETTING (INCLUDING INFORMATION INDICATING BEAM TO BE USED)
S308
RECOGNIZE MOVEMENT OF TERMINAL DEVICE
S310
DETERMINE WIRELESS NODE THAT IS DESTINATION OF HANDOVER
S312
OPERATION PARAMETER MODIFICATION COMMAND (INCLUDING INFORMATION INDICATING BEAM TO BE USED)
S314
HANDOVER PROCEDURE START COMMAND 700
705
706
701
PROCESSOR
702
MEMORY
703
STORAGE
704
NETWORK I/F 830
850
855
WIRELESS COMMUNICATION I/F
856
BB
856
BB
851
CONTROLLER
852
MEMORY
853
NETWORK I/F
857
COUPLING I/F
854
860
861
COUPLING I/F
863
WIRELESS COMMUNICATION I/F
864
RF
864
RF
840
840

CONTROL DEVICE, WIRELESS DEVICE, METHOD, AND RECORDING MEDIUM

CROSS-REFERENCE TO RELATED APPLICATIONS

The present application is based on PCT filing PCT/JP2018/017857, filed May 9, 2018, which claims priority to JP 2017-151381, filed Aug. 4, 2017, the entire contents of each are incorporated herein by reference.

TECHNICAL FIELD

The present disclosure relates to a control device, a wireless device, a method, and a recording medium.

BACKGROUND ART

A variety of wireless systems such as a cellular network, wireless LAN (Local Area Network), a TV broadcasting system, a satellite communication system, and PMSE (Program Making Special Events) have been recently widely used. To enable each of the wireless systems to normally operate, it is desirable to manage frequency resources being used for prevention of interference between the respective wireless systems. The same applies to local networks included in one wireless system.

Regarding frequency resource management, frequency sharing has been studied as one of measures for slowing the future depletion of frequency resources. For example, a mechanism for enabling a frequency channel assigned to a certain wireless system to be temporarily used by another wireless system has been studied. Such a mechanism is sometimes referred to as secondary use of frequency. In general, a system to which a frequency channel is preferentially assigned is referred to as primary system (Primary System), and a system that secondarily uses the frequency channel is referred to as secondary system (Secondary System).

An example of an approach regarding secondary use of frequency is the report and order (R & O: Report & Order) regarding the use of mobile communications at a frequency band of 24 GHz or higher, which has been issued by the FCC (Federal Communications Commissions) as described in NPL 1 below. The R & O is accompanied by the final bills regarding frequency sharing.

Technologies for frequency sharing have been actively developed in conjunction with legislation for frequency sharing. For example, PTL 1 below discloses a technology where conditions for use of a sharable frequency band by a wireless communication device are calculated on the basis of two-dimensional location information and level information of the wireless communication device.

CITATION LIST

Patent Literature

PTL 1: Japanese Unexamined Patent Application Publication No. 2016-19134

Non-Patent Literature

NPL 1: FCC 16-89, "REPORT AND ORDER AND FURTHER NOTICE OF PROPOSED RULEMAKING", Jul. 14, 2016

SUMMARY OF THE INVENTION

Problems to be Solved by the Invention

The above literatures, however, each exclude a case where the secondary system performs beam forming. A magnitude of interference with the primary system may vary depending on a beam direction. Thus, a desirable method for secondary use of frequency is supposed to be different depending on whether or not beam forming is performed.

Accordingly, the present disclosure proposes a mechanism for secondary use of frequency suitable for a case where a secondary system performs beam forming.

Means for Solving the Problems

According to the present disclosure, there is provided a control device including: a first acquiring section; a second acquiring section; a determining section; and a notifying section. The first acquiring section acquires first geolocation information of a datum point for interference calculation of a first wireless operation and calculates or acquires an interference acceptable amount at the datum point. The second acquiring section acquires second geolocation information, first antenna information, and first beam pattern information of a wireless device belonging to a second wireless operation that shares a portion or all of a frequency assigned to the first wireless operation. The first beam pattern information indicates a beam pattern usable by the wireless device. The determining section determines information regarding a beam permitted to the wireless device on the basis of the first geolocation information and the interference acceptable amount of the datum point, and the second geolocation information, the first antenna information, and the first beam pattern information of the wireless device. The notifying section notifies the wireless device or a device related to the wireless device of the information regarding the beam permitted to the wireless device.

In addition, according to the present disclosure, there is provided a wireless device that operates on the basis of control by a control device. The wireless device belongs to a second operation that shares a portion or all of a frequency assigned to a first wireless operation. The wireless device includes: a notifying section; an acquiring section; and a processing section. The notifying section notifies the control device of second geolocation information, first antenna information, and first beam pattern information of the wireless device. The first beam pattern information indicates a beam pattern usable by the wireless device. The acquiring section acquires information regarding a beam permitted to the wireless device. The information regarding the beam permitted to the wireless device is determined by the control device on the basis of first geolocation information of a datum point for interference calculation of the first wireless operation, an interference acceptable amount at the datum point, and the second geolocation information, the first antenna information, and the first beam pattern information of the wireless device. The processing section transmits a beam on the basis of the information regarding the beam permitted to the wireless device.

In addition, according to the present disclosure, there is provided a method including: acquiring first geolocation information of a datum point for interference calculation of a first wireless operation and calculating or acquiring an interference acceptable amount at the datum point; acquiring second geolocation information, first antenna information, and first beam pattern information of a wireless device belonging to a second wireless operation that shares a portion or all of a frequency assigned to the first wireless operation; determining, by a processor, information regarding a beam permitted to the wireless device on the basis of the first geolocation information and the interference acceptable amount of the datum point, and the second geolocation information, the first antenna information, and the first beam pattern information of the wireless device; and notifying the wireless device or a device related to the wireless device of the information regarding the beam permitted to the wireless device. The first beam pattern information indicating a beam pattern usable by the wireless device.

In addition, according to the present disclosure, there is provided a method including: notifying a control device of second geolocation information, first antenna information, and first beam pattern information of a wireless device that operates on the basis of control by the control device; acquiring information regarding a beam permitted to the wireless device; and transmitting, by a processor, a beam on the basis of the information regarding the beam permitted to the wireless device. The wireless device belongs to a second operation that shares a portion or all of a frequency assigned to a first wireless operation. The first beam pattern information indicating a beam pattern usable by the wireless device. The information regarding the beam permitted to the wireless device is determined by the control device on the basis of first geolocation information of a datum point for interference calculation of the first wireless operation, an interference acceptable amount at the datum point, and the second geolocation information, the first antenna information, and the first beam pattern information of the wireless device.

In addition, according to the present disclosure, there is provided a recording medium having a program recorded thereon. The program causes a computer to function as a first acquiring section, a second acquiring section, a determining section, and a notifying section. The first acquiring section acquires first geolocation information of a datum point for interference calculation of a first wireless operation and calculates or acquires an interference acceptable amount at the datum point. The second acquiring section acquires second geolocation information, first antenna information, and first beam pattern information of a wireless device belonging to a second wireless operation that shares a portion or all of a frequency assigned to the first wireless operation. The first beam pattern information indicates a beam pattern usable by the wireless device. The determining section determines information regarding a beam permitted to the wireless device on the basis of the first geolocation information and the interference acceptable amount of the datum point, and the second geolocation information, the first antenna information, and the first beam pattern information of the wireless device. The notifying section notifies the wireless device or a device related to the wireless device of the information regarding the beam permitted to the wireless device.

In addition, according to the present disclosure, there is provided a recording medium having a program recorded thereon. The program causes a computer to function as a notifying section; an acquiring section; and a processing section. The notifying section notifies a control device of second geolocation information, first antenna information, and first beam pattern information of a wireless device that operates on the basis of control by the control device. The wireless device belongs to a second operation that shares a portion or all of a frequency assigned to a first wireless operation. The first beam pattern information indicates a beam pattern usable by the wireless device. The acquiring section acquires information regarding a beam permitted to the wireless device. The information regarding the beam permitted to the wireless device is determined by the control device on the basis of first geolocation information of a datum point for interference calculation of the first wireless operation, an interference acceptable amount at the datum point, and the second geolocation information, the first antenna information, and the first beam pattern information of the wireless device. The processing section transmits a beam on the basis of the information regarding the beam permitted to the wireless device.

Effects of the Invention

As described above, according to the present disclosure, the mechanism for the secondary use of frequency suitable for a case where the secondary system performs beam forming is provided. It should be noted that the above effects are not necessarily limitative. Any of the effects indicated in this description or other effects that may be understood from this description may be exerted in addition to the above-described effects or in place of the above-described effects.

BRIEF DESCRIPTION OF DRAWING

FIG. 6 is a sequence diagram illustrating an example of a flow of a beam management process executed in the system according to the present embodiment.

FIG. 10 is a sequence diagram illustrating an example of a flow of a beam management process for the handover executed in the system according to the present embodiment.

MODES FOR CARRYING OUT THE INVENTION

Figure 1:
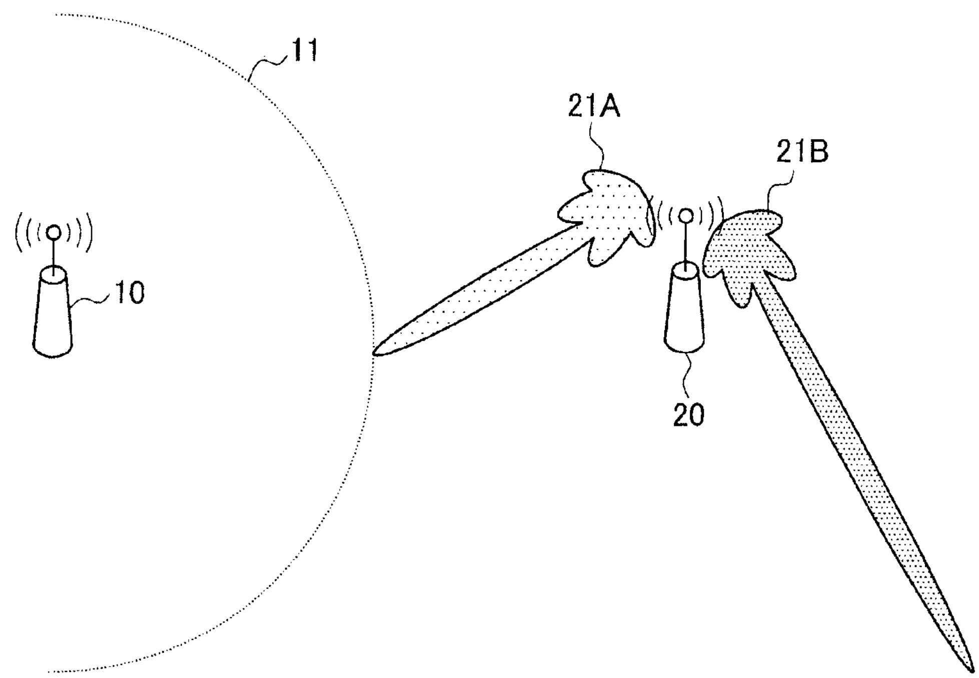
FIG. 1 is a diagram for describing protection of a primary system in an environment where beam forming is performed.

The following describes a preferred embodiment of the present disclosure in detail with reference to the accompanying drawings. It should be noted that, in this description and the accompanying drawings, components that have substantially the same functional configuration are denoted by the same reference signs, and thus redundant description thereof is omitted.

Further, in this specification and the drawings, there are cases in which elements having substantially the same functional configuration are distinguished by adding different alphabets after the same reference numeral. For example, a plurality of elements having substantially the same functional configuration is distinguished as wireless nodes 300A, 300B, and 300C as necessary. However, in a case where it is not necessary to particularly distinguish a plurality of elements having substantially the same functional configuration, only the same reference numeral is attached. For example, in a case where it is not necessary to particularly distinguish the wireless nodes 300A, 300B, and 100C, they are referred to simply as wireless nodes 300.

It should be noted that the description is given in the following order.

1. Introduction
2. Configuration Examples
2.1. Overall Configuration Example
2.2. Configuration Example of Frequency Administration Database
2.3. Configuration Example of Wireless Node
3. Technical Features
3.1. Basic Operation
3.2. Operation for Case Where Number of Wireless Nodes is Increased
3.3. Application to Handover
4. Application Examples
5. Summary

1. Introduction

The FCC (Federal Communications Commission) issued the report and order (R & O: Report & Order) regarding the use of mobile communications at a frequency band of 24 GHz or higher on Jul. 14, 2016. The R & O is accompanied by the final bills regarding frequency sharing. New FCC rules are expected to be adopted on the basis of the final bills. Moreover, in the R & O, more opinions regarding the FNPRM (Further Notice of Proposed Rulemaking) for several frequency bands are invited. Especially, for 71 GHz to 76 GHz and 81 GHz to 86 GHz (70/80-GHz bands), frequency sharing based on a mechanism of the CBRS (Citizens Broadband Radio Service) defined by 47 C.F.R Part 96 adopted on Aug. 25, 2016 has been proposed.

For the 70/80-GHz bands, as an example, a system in Table 1 below is used as an incumbent system (Incumbent system). The incumbent system is an example of the primary system. A secondary user (i.e., secondary system (Secondary system)) and a tertiary user (i.e., tertiary system) are required not to fatally interfere with the incumbent system. Such protection of the incumbent system is also referred to as Incumbent protection. The secondary user corresponds to a PAL (Priority Access License) user in a mechanism of the CBRS. The tertiary user corresponds to a GAA (General Authorized Access) user in the mechanism of the CBRS.

TABLE 1

Examples of Incumbent System for 70/80-GHz Bands

| Spectrum | Spectrum Segment | Incumbent System | Notes |
|---|---|---|---|
| 71-76 GHz | 71-74 GHz | Federal and non-Federal Fixed, FSS (Fixed Satellite Service), Mobile. MSS (Mobile Satellite Service) (space-to-Earth) | |
| | 74-76 GHz | Federal and non-Federal Fixed, FSS (space-to-Earth), Mobile Space Research Service (SRS) | |
| 76-81 GHz | 76-77 GHz | Unlicensed vehicular radars under Part 15 | Vehicular radars might be shifted to Part 96 away from the existing Part 15 unlicensed model. |
| | 76-81 GHz | Non-Federal radar applications | The Commission has proposed to authorize non-Federal radar applications in the 76-81 GHz band on a licensed basis under Part 95 |
| 81-86 Ghz | 81-84 GHz | Federal and non-Federal MSS (Earth-to-space) | |
| | 81-86 GHz | Federal and non-Federal Fixed FSS (Earth-to-space), Mobile | |

Regarding Incumbent protection, a technique of defining an exclusion zone (Exclusion Zone) or a protection zone (Protection Zone) for protection of the incumbent system has been known. In such a method, a frequency administration database determines a frequency and a maximum permissible transmission power usable by a secondary system on the basis of location information of the secondary system. The maximum permissible transmission power means a maximum transmission power permitted to the secondary system.

An example of such a protection technique is the ECC Report 186, which is a legislation guideline for the European TVWS (TV band White Space). The legislation guideline recommends a technique of determining the maximum permissible transmission power for the secondary system on the basis of a reference point (Reference point) for calculation of a received interference power of the primary system and a propagation loss between the primary system and the secondary system. In addition, the legislation guideline recommends a technique of determining the maximum permissible transmission power for the secondary system in consideration of an accumulated interference power.

In this regard, for a high frequency band such as 70/80 GHz, beam forming (beam steering) is assumed to be performed with use of a MIMO (Multiple Input Multiple Output) technology. In addition, beam management for managing which beam is to be transmitted is supposed to be spatially performed. However, a technology for protecting the primary system in an environment where beam forming is performed has not been developed.

Figure 2:
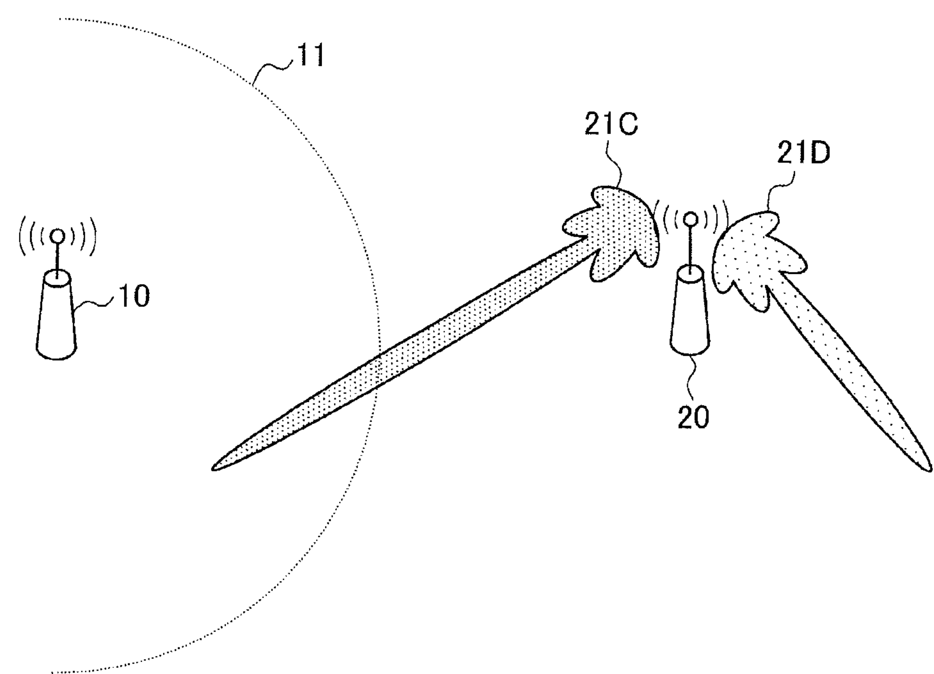
FIG. 2 is a diagram for describing the protection of the primary system in the environment where beam forming is performed.

Each of FIG. 1 and FIG. 2 is a diagram for describing the protection of the primary system in the environment where beam forming is performed. As illustrated in FIG. 1 and FIG. 2, a wireless node 20 of a secondary system is located near a wireless node 10 of a primary system. It is assumed that the wireless node 20 of the secondary system is able to simultaneously transmit two types of beams 21. The wireless node 20 of the secondary system is able to transmit the beams 21 in desired directions to desired distances. The directions of the beams 21 are each determined by a later-described beam pattern. The distances to be reached by the beams 21 are each determined by the beam pattern and a transmission power. For example, a directional gain increases with an increase in the sharpness of beam directivity, allowing the beam to reach a further distance with the same transmission power.

To protect the wireless node 10 of the primary system, it is desirable to prevent the beams 21 transmitted from the wireless node 20 of the secondary system from reaching, beyond a protection contour (protection contour) 11, an inside of the protection contour 11. In the example illustrated in FIG. 1, the wireless node 20 of the secondary system transmits a beam 21A in a direction toward the wireless node 10 of the primary system and transmits a beam 21B in another direction. Neither the beam 21A nor the beam 21B reaches the inside of the protection contour 11. In the example illustrated in FIG. 2, the wireless node 20 of the secondary system transmits a beam 21C in a direction toward the wireless node 10 of the primary system and transmits a beam 21D in another direction. While the beam 21D does not reach the inside of the protection contour 11, the beam 21C reaches the inside of the protection contour 11.

In the conventional protection method, the maximum permissible transmission power is set in accordance with a location of the wireless node 20 of the secondary system. In this regard, assuming a situation where interference is maximized, the maximum permissible transmission power for the wireless node 20 of the secondary system is set to allow the wireless node 10 of the primary system to be protected even if the wireless node 20 of the secondary system transmits a beam in the direction toward the wireless node 10 of the primary system. For example, the maximum permissible transmission power for the wireless node 20 of the secondary system is set with reference to the beam 21A. This restrains the wireless node 20 of the secondary system from transmitting a beam such as the beam 21C that reaches the inside of the protection contour 11. However, not only that, the same maximum permissible transmission power is applied to a beam transmitted in a direction different from the direction toward the wireless node 10 of the primary system. This results in uniformly restraining transmission of even a beam, such as the beam 21B against which the primary system is protectable.

Considering frequency use efficiency, it is desirable to selectively prohibit a beam against which protection of the primary system is difficult while permitting a beam against which protection of the primary system is possible. In other words, it is desirable to permit transmission of both the beam 21A and the beam 21B illustrated in FIG. 1.

Accordingly, in view of the circumstances described above, the present disclosure provides a mechanism for secondary use of frequency suitable for a case where a secondary system performs beam forming.

2. Configuration Examples

2.1. Overall Configuration Example

Figure 3:
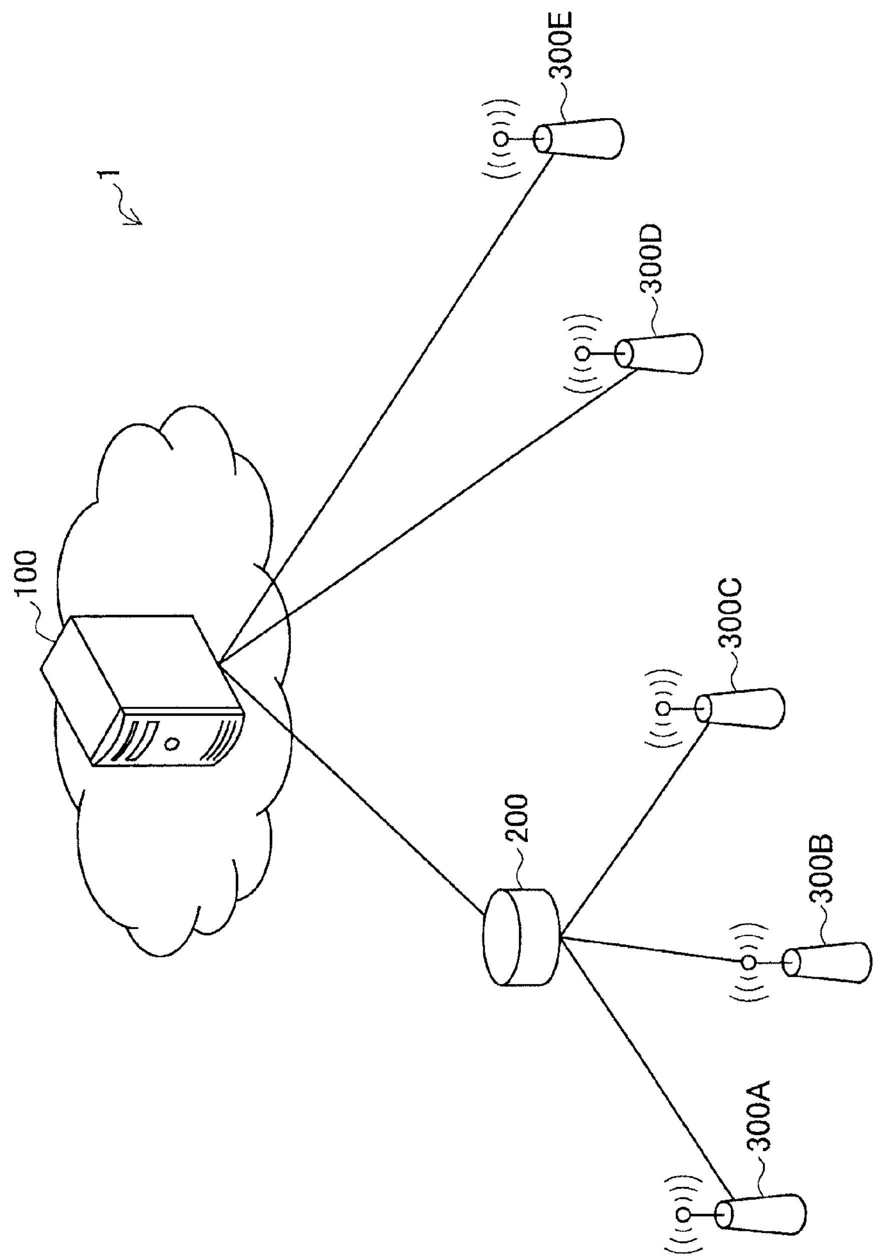
FIG. 3 is a diagram for describing an example of a configuration of a system according to an embodiment of the present disclosure.

FIG. 3 is a diagram for describing an example of a configuration of a system 1 according to an embodiment of the present disclosure. As illustrated in FIG. 3, the system 1 according to the present embodiment includes a frequency administration database 100, a network manager 200, and a plurality of wireless nodes 300 (300A to 300E).

The frequency administration database 100 is a control device that performs administration for secondary use of frequency. If described in detail, the frequency administration database 100 is a control device that performs administration of wireless devices belonging to a second wireless operation (e.g., secondary system) that shares a portion or all of a frequency assigned to a first wireless operation (e.g., primary system). Specifically, the frequency administration database 100 provides secondarily usable frequency information to the wireless nodes 300, and permits and manages the secondary use of frequency. Moreover, the frequency administration database 100 performs control for secondary use of frequency in consideration of beam forming by the wireless nodes 300. Here, the wireless operation means a wireless service, which is a concept including bidirectional communication such as cellular communication, and unidirectional wireless transmission and reception such as radar.

The network manager 200 is a control device that manages a network under management. For example, the network manager 200 collectively collects pieces of information of the wireless nodes 300 under management and transmits the information to the frequency administration database 100, and transmits information received from the frequency administration database 100 to the wireless nodes 300 under management.

The wireless nodes 300 are wireless devices belonging to the secondary system. The wireless nodes 300 operate on the basis of the control by the frequency administration database 100. For example, the wireless nodes 300 each provide a wireless service to a terminal device not illustrated on the basis of the control by the frequency administration database 100. It should be noted that the wireless nodes 300 herein are assumed to be communication devices that perform bidirectional communication such as cellular communication.

Basically, the wireless nodes 300 (300A to 300C) operate on the basis of the control by the network manager 200. In this case, the wireless nodes 300 access the frequency administration database 100 via the network manager 200 or the network manager 200 accesses the frequency administration database 100 in place of the wireless nodes 300.

Exceptionally, the wireless nodes 300 (300D and 300E) directly access the frequency administration database 100 in a case where the wireless nodes 300 operate without being controlled by the network manager 200.

2.2. Configuration Example of Frequency Administration Database

Figure 4:
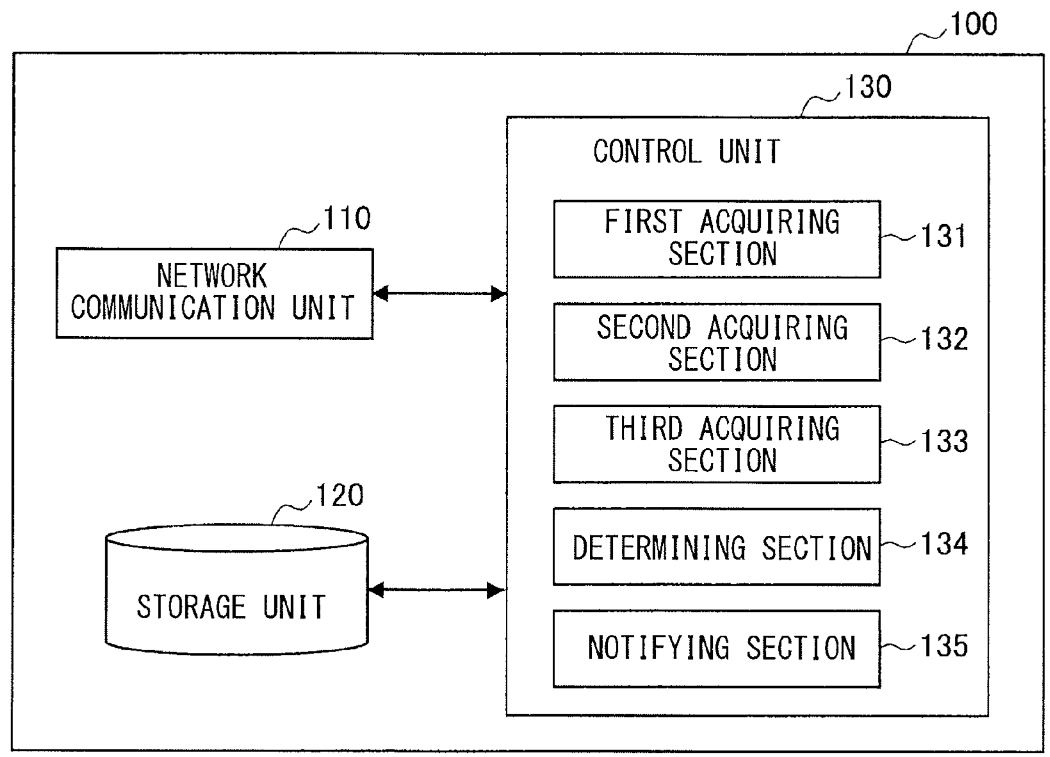
FIG. 4 is a block diagram illustrating an example of a logical configuration of a frequency administration database according to the present embodiment.

FIG. 4 is a block diagram illustrating an example of a logical configuration of the frequency administration database 100 according to the present embodiment. As illustrated in FIG. 4, the frequency administration database 100 includes a network communication unit 110, a storage unit 120, and a control unit 130.

(1) Network Communication Unit 110

The network communication unit 110 transmits and receives information. For example, the network communication unit 110 transmits information to another and receives information from another node. For example, the above other node includes another other frequency administration database 100, another network manager 200, and other wireless nodes 300.

(2) Storage Unit 120

The storage unit 120 temporarily or permanently stores programs and various kinds of data for operation of the frequency administration database 100.

(3) Control Unit 130

The control unit 130 controls the operation of the frequency administration database 100 as a whole and provides a variety of functions of the frequency administration database 100. The control unit 130 includes a first acquiring section 131, a second acquiring section 132, a third acquiring section 133, a determining section 134, and a notifying section 135.

The first acquiring section 131 has a function to acquire information regarding the primary system. The second acquiring section 132 has a function to acquire information regarding each of the wireless nodes 300 belonging to the secondary system. The third acquiring section 133 has a function to acquire information regarding wireless nodes other than the wireless nodes 300. The acquisition of the information by the first acquiring section 131 to the third acquiring section 133 is enabled by transmission and reception of the information by the network communication unit 110 or reading of the information stored in the storage unit 120.

The determining section 134 has a function to determine a control content for each of the wireless nodes 300. For example, the determining section 134 determines information regarding a beam permitted to the wireless node 300. The determining section 134 also determines whether or not a beam to be used by the wireless node 300 is permitted to be used.

The notifying section 135 has a function to notify another node of the information determined by the determining section 134. The notification of the information by the notifying section 135 is enabled by transmission and reception of the information by the network communication unit 110. It should be noted that the notifying section 135 may notify the wireless node 300 via the network manager 200 or not via the network manager 200.

The detailed operations of these components are described in detail below. The control unit 130 may further include other components elements in addition to these components. That is, the control unit 130 may also perform other operations in addition to the operations of these components.

2.3. Configuration Example of Wireless Node

Figure 5:
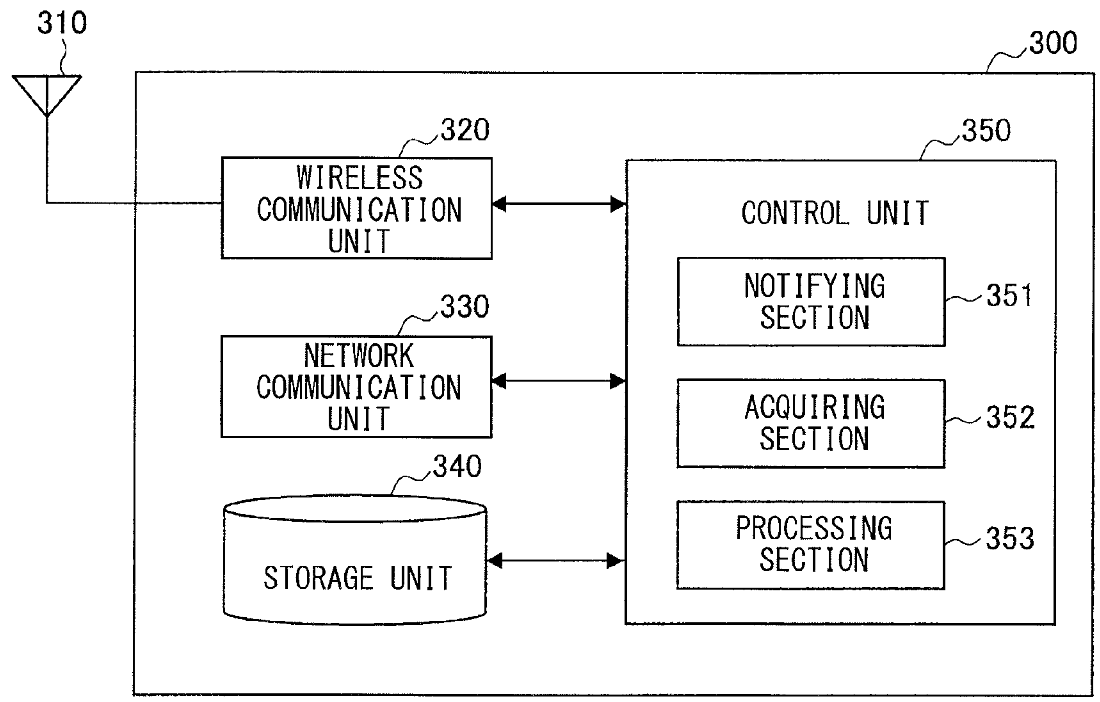
FIG. 5 is a block diagram illustrating an example of a logical configuration of a wireless node according to the present embodiment.

FIG. 5 is a block diagram illustrating an example of a logical configuration of the wireless node 300 according to the present embodiment. With reference to FIG. 5, the wireless node 300 includes an antenna unit 310, a wireless communication unit 320, a network communication unit 330, a storage unit 340, and a control unit 350.

(1) Antenna Unit 310

The antenna unit 310 radiates signals outputted from the wireless communication unit 320 to space as radio waves. The antenna unit 310 also converts radio waves in the space into signals, and outputs the signals to the wireless communication unit 320.

(2) Wireless Communication Unit 320

The wireless communication unit 320 transmits and receives signals. For example, the wireless communication unit 320 transmits a downlink signal to the terminal device and receives an uplink signal from the terminal device.

(3) Network Communication Unit 330

The network communication unit 330 transmits and receives information. For example, the network communication unit 330 transmits information to another and receives information from another node. For example, the above other node includes the frequency administration database 100, the network manager 200, and other wireless nodes 300.

(4) Storage Unit 340

The storage unit 340 temporarily or permanently stores programs and various kinds of data for operation of the wireless node 300.

(5) Control Unit 350

The control unit 350 controls the operation of each of the wireless nodes 300 as a whole and provides a variety of functions of the wireless node 300. The control unit 350 includes a notifying section 351, an acquiring section 352, and a processing section 353.

The notifying section 351 has a function to notify another node of the information regarding the wireless node 300. The notification of the information by the notifying section 351 is enabled by transmission and reception of the information by the network communication unit 330.

The acquiring section 352 has a function to acquire the information regarding the wireless node 300 from another node. The acquisition of the information by the acquiring section 352 is enabled by transmission and reception of the information by the network communication unit 330.

The processing section 353 has a function to perform a variety of processes for the wireless service. For example, the processing section 353 selects a beam to be transmitted on the basis of the information regarding the beam permitted to the wireless node 300 and transmits a transmission signal with use of the selected beam. It should be noted that the processing section 353 forms a beam by performing digital beam forming, analog beam forming, or both. Transmission of the transmission signal with use of a beam is enabled by a signal process by the wireless communication unit 320 and electric wave radiation by the antenna unit 310.

The detailed operations of these components are described in detail below. The control unit 350 may further include other components elements in addition to these components. That is, the control unit 350 may also perform other operations in addition to the operations of these components.

3. Technical Features

3.1. Basic Operation (1) Information Regarding Primary System

The frequency administration database 100 (first acquiring section 131) acquires information regarding the primary system. The frequency administration database 100 may acquire the information regarding the primary system through communication with the primary system or stores the information regarding the primary system in advance. For example, the frequency administration database 100 acquires geolocation information (corresponding to first geolocation information) of a datum point for interference calculation of the primary system. The datum point is also referred to as reference point (Reference Point) in some cases. For example, the datum point is a spot on the protection contour 11 described above with reference to FIG. 1 and FIG. 2.

The geolocation information is information indicating a geographical location. For example, the geolocation information includes longitude and latitude. For example, the geolocation information may be coordinate information indicating predefined fine grids that allow for identifying a specific spot. Alternatively, the geolocation information may be relative location information based on a datum location. The geolocation information is not limited to two-dimensional location information, but may be three-dimensional location information including a level.

In addition, the frequency administration database 100 calculates or acquires an interference acceptable amount at the datum point for the interference calculation of the primary system. For example, the frequency administration database 100 acquires a legally defined value and sets the acquired value as the interference acceptable amount. The frequency administration database 100 may calculate a value by adding a margin to the legally defined value and set the calculated value as the interference acceptable amount. The interference acceptable amount is sometimes defined not as a value, but as an acceptable degree of deterioration from a predetermined communication quality. In this case, the frequency administration database 100 calculates a value indicating a communication quality resulting from the predetermined communication quality deteriorating by an amount corresponding to the acceptable degree of deterioration and sets the calculated value as the interference acceptable amount. For example, in a case where 0.05% deterioration from predetermined SNR is acceptable, a communication quality resulting from 0.05% deterioration from the predetermined SNR is calculated as SINR and set as the interference acceptable amount.

(2) Information Regarding Secondary System

The frequency administration database 100 (second acquiring section 132) acquires information regarding the secondary system. Typically, the frequency administration database 100 acquires the information regarding the secondary system through communication with the secondary system. For example, the frequency administration database 100 acquires geolocation information (corresponding to second geolocation information), antenna information (corresponding to first antenna information), and beam pattern information (corresponding to first beam pattern information) of each of the wireless nodes 300. The beam pattern information indicates a beam pattern usable by the wireless node 300. For example, the frequency administration database 100 acquires these pieces of information from the wireless node 300.

The antenna information is information including various kinds of information regarding an antenna. For example, the antenna information includes at least one of an antenna model, an antenna gain, the number of antenna elements, an antenna dimension (two-dimension or three-dimension), a distance between antenna elements, an installation elevation angle, an installation azimuth angle, or an installation level. The antenna information may also include information indicating a beam width. For an antenna with an antenna orientation that is dynamically changeable, the antenna information may include at least one of an elevation-angle motion range or an azimuth-angle motion range.

The beam pattern information is information defining a beam shape (including a direction). For example, the beam pattern information includes at least one of a codebook including one or more precoding matrices, a weight matrix, or a steering vector. For an antenna with an antenna orientation that is dynamically changeable, the beam pattern information may include a combination of an elevation angle, an azimuth angle, and a beam width of the antenna.

Each of the wireless nodes 300 (e.g., notifying section 351) notifies the frequency administration database 100 of geolocation information, antenna information, and beam pattern information of the wireless node 300. The beam pattern information indicates a beam pattern usable by the wireless node 300. The wireless node 300 may notify the frequency administration database 100 of these pieces of information via the network manager 200 or notify the frequency administration database 100 of these pieces of information not via the network manager 200.

It should be noted that in a case where each of the wireless nodes 300 is installed by a mobile communication provider, etc. (i.e., in a case of Professional Install), these pieces of information are sometimes included in installation information that is submitted to an authority concerned at the time of installation. In this case, the frequency administration database 100 may acquire such installation information instead of being notified by the wireless node 300.

(3) Determination of Permitted Beam Information

On the basis of the geolocation information and interference acceptable amount of the primary system and the geolocation information, antenna information and beam pattern information of each of the wireless nodes 300 belonging to the secondary system, the frequency administration database 100 (e.g., determining section 134) determines information regarding the beam permitted to the wireless node 300. For example, the frequency administration database 100 restrains the use of a portion of beams usable by the wireless node 300 and permits the use of the other portions of the beams. This enables flexible beam management that restrains the use of a beam against which protection of another system such as the primary system is difficult among beams usable by the wireless nodes 300 and permits the use of a beam against which the protection is possible.

The information regarding the beam permitted to the wireless node 300 is information including one or more combinations of information indicating a permitted beam pattern and information indicating a transmission power permitted for the use of the beam pattern. Thus, the permitted transmission power is determined per permitted beam pattern, allowing the transmission power to be determined per beam direction. Consequently, it is possible to achieve flexible beam management that, for example, permits a small transmission power to a beam pointing in the direction toward the primary system and a large transmission power to a beam pointing in another direction. In addition, the large transmission power is permitted to the beam not pointing in the direction toward the primary system, allowing the wireless node 300 to provide a wireless service to a terminal device located at a further distance with an improved frequency use efficiency. It should be noted that the information indicating the transmission power permitted for the use of the permitted beam pattern may be information indicating a range of the permitted transmission power or information indicating the permitted transmission power itself. For example, information corresponding to the former is a maximum permissible transmission power. The information regarding the beam permitted to the wireless node 300 is also referred to as permitted beam information hereinafter.

The permitted beam information may be associated with a frequency. If described in detail, the permitted beam information may be information including one or more combinations of a frequency, information indicating a beam pattern permitted at the frequency, and information indicating a transmission power permitted for the use of the beam pattern at the frequency. The acceptable amount of interference with the primary system may vary depending on frequency. In this regard, the permitted beam information is associated with a frequency, enabling flexible beam management that is performed in accordance with the interference acceptable amount per frequency.

It should be noted that the frequency with which the permitted beam information is associated is a frequency included in 70/80-GHz bands. Specifically, the frequency with which the permitted beam information is associated is a frequency of a given bandwidth included in a range from 71 GHz to 86 GHz. A frequency band where beam forming may be performed is the 70/80-GHz bands. Thus, as the frequency with which the permitted beam information is associated is included in the 70/80-GHz bands, it is possible to perform beam management exclusively within the frequency band where the beam forming may be performed.

Table 2 below demonstrates examples of the permitted beam information.

TABLE 2

Specific Examples of Permitted Beam Information

| Frequency | | F1 | | F2 | |
|---|---|---|---|---|---|
| Transmission Power | P1 | P2 | P3 | P3 | P4 |
| Beam Pattern | B1 | B2 | B3 | B3 | B4 |

In the examples in Table 2 above, a combination of a transmission power P1 and a beam pattern B1, a combination of a transmission power P2 and a beam pattern B2, and a combination of a transmission power P3 and a beam pattern B3 are permitted at a frequency F1. Meanwhile, a combination of the transmission power P3 and the beam pattern B3 and a combination of a transmission power P4 and a beam pattern B4 are permitted at a frequency F2.

Specific determination methods of the permitted beam information are described below.

First Method

According to a first method, the frequency administration database 100 determines the permitted beam information from a combination of a directional gain and a transmission power. The first method is described below in detail.

A path-loss between the datum point for interference calculation of the primary system and each of the wireless nodes 300 is denoted by $m_g$ [dB]. The interference acceptable amount at the datum point is denoted by $I_{req}$. The transmission power of the wireless node 300 is denoted by P [dBm]. A directional gain pointing in the direction toward the primary system is assumed to be G [dB]. The frequency administration database 100 determines the transmission power P and the directional gain G of the wireless node 300 to prevent a value given by subtracting the path-loss $m_g$ between the datum point and the wireless node 300 from a sum of the transmission power P and the directional gain G of the wireless nodes 300 from exceeding the interference acceptable amount $I_{req}$ at the datum point. That is, the frequency administration database 100 determines the transmission power P and the directional gain G of the wireless node 300 that satisfy an expression (1) below.

$$I_{req} \geq P+G-m_g \quad (1)$$

In other words, the frequency administration database 100 determines the transmission power P and the directional gain G of the wireless node 300 that satisfy an expression (2) below. The expression (2) below is transformed from the expression (1) above.

$$I_{req}+m_g \geq P+G \quad (2)$$

The right side of the expression (2) above is EIRP (Equivalent isotropically radiated power).

For example, the transmission power P of the wireless node 300 is assumed to be variable by x [dBm]. In this case, while varying the transmission power P by x [dBm], the frequency administration database 100 determines the directional gain G that satisfies the expression (2) above at each of the transmission powers P. If described in detail, the frequency administration database 100 first calculates the values of the respective directional gains G of one or more beam patterns able to be formed by the wireless node 300 on the basis of the beam pattern information of the wireless nodes 300. The frequency administration database 100 then selects the directional gain G that satisfies the expression (2) above from among the plurality of calculated directional gains G.

A set of thus-obtained combinations of the transmission power P and information indicating the beam pattern corresponding to the directional gain G that satisfies the expression (2) above at the transmission power P is the permitted beam information.

Second Method

According to a second method, the frequency administration database 100 determines a combination of a steering vector or a weight matrix and a transmission power that provides an interference amount satisfying (i.e., falling below) the interference acceptable amount at the datum point of the primary system as the permitted beam information. The second method is described below in detail.

It is assumed hereinbelow that a protection contour corresponds to the datum point of the primary system. A signal y at the protection contour is defined by the following expression.

[Expression 1]

$$y=h^T ws \quad (3)$$

Here, h denotes a channel vector. A steering vector is denoted by w. A transmission signal is denoted by s.

The interference acceptable amount at the protection contour is denoted by $I_{req}$. For protection of the primary system, it is desirable that the following expression be true.

[Expression 2]

$$|y|^2=|h^T ws|^2 \leq I_{req} \quad (4)$$

It is assumed that a correlation between the transmission signal s and a white noise n is zero and the channel vector h is a complex Gaussian random variable with average 0 and variance 1. The expression (4) above is then transformed to the following expressions.

[Expression 3]

$$P_s|w^H h^* h^T w| \leq I_{req} \quad (5)$$

$$P_s|w^H w| \leq I_{req} \quad (6)$$

The frequency administration database 100 determines a combination of a transmission power $P_s$ and the steering vector w that satisfies the expression (6) above. A set of thus-obtained combinations of the transmission power $P_s$ and the steering vector w that satisfies the expression (6) above at the transmission power $P_s$ is the permitted beam information.

Similarly to the above, in a case of calculating the weight matrix, a condition expression to be satisfied by the transmission power and the weight matrix is obtained. The frequency administration database 100 then determines a combination of the transmission power and the weight matrix that satisfies the condition expression. A set of thus-obtained combinations of a transmission power and a weight matrix that satisfies the condition expression at the transmission power is the permitted beam information.

Third Method

According to a third method, the frequency administration database 100 determines the permitted beam information by extracting a precoding matrix satisfying (i.e., falling below) the interference acceptable amount at the datum point of the primary system from the codebook. The third method is described below in detail.

A codebook F includes one or more precoding matrices $F_i$. That is, $F=\{F_1, F_2, \ldots, F_n\}$. For protection of the primary system, it is desirable that the following expression be true.

[Expression 4]

$$\arg_{F_i \in F}\{\|r\|^2 = \|HF_i s\|^2 \le I_{req}\} \tag{7}$$

Here, h denotes a channel vector. $I_{req}$ denotes the interference acceptable amount at the datum point of the primary system. A signal at the datum point of the primary system is denoted by r.

The frequency administration database 100 searches for the precoding matrices $F_i$ that satisfy the expression (7) above. A set of the precoding matrices $F_i$ resulting from the search is the permitted beam information.

Specific determination methods of the permitted beam information have described above.

Here, although a beam is permitted in a case where the beam is transmitted alone, simultaneous transmission of a plurality of beams may not be permitted. As an example of such a case, simultaneous transmission of a plurality of beams causes a cumulative effect of interference and the interference acceptable amount at the datum point of the primary system sometimes fails to be satisfied. As another example, simultaneous transmission of a plurality of beams causes a cumulative effect of interference, sometimes making it difficult for another wireless node 300 to provide predetermined QoS (Quality of Service) to a terminal device.

Accordingly, the frequency administration database 100 (e.g., determining section 134) determines a combination of beams not permitted to be transmitted in combination among a plurality of beams permitted to the wireless node 300 and reflects a determination result in the permitted beam information. If described in detail, among a set of combinations of the information indicating a permitted beam pattern and the information indicating a transmission power permitted for the use of the beam pattern, the frequency administration database 100 determines a plurality of combinations not permitted to be simultaneously used. The frequency administration database 100 then reflects a determination result in the permitted beam information. For example, the frequency administration database 100 may add information to the permitted beam information. The added information indicates a plurality of beams not permitted to be simultaneously used among the information (the combinations of the information indicating the beam pattern and the information indicating the transmission power) indicating the permitted beams included in the permitted beam information. Alternatively, the frequency administration database 100 may delete information from the permitted beam information. The deleted information indicates at least a portion of the plurality of beams not permitted to be simultaneously used among the information indicating the permitted beams included in the permitted beam information.

Reflecting the determination result of the combinations of beams not permitted to be transmitted in combination in the permitted beam information makes it possible to prevent the wireless nodes 300 from simultaneously transmitting the beams not permitted to be simultaneously transmitted. Thus, even in a case where the wireless nodes 300 simultaneously transmit a plurality of beams, it is possible to protect the primary system irrespective of a combination of simultaneously transmitted beams.

(4) Operation Based on Permitted Beam Information

The frequency administration database 100 (e.g., notifying section 135) notifies each of the wireless nodes 300 or a device related to the wireless node 300 of the permitted beam information. The device related to the wireless node 300 is the network manager 200 under which the wireless node 300 is managed.

The wireless node 300 (e.g., acquiring section 352) acquires the permitted beam information given by the frequency administration database 100.

The wireless node 300 (e.g., processing section 353) transmits a beam on the basis of the permitted beam information. If described in detail, the wireless node 300 selects a combination to be used among from combinations of the information indicating a permitted beam pattern and the information indicating a transmission power permitted for the use of the permitted beam pattern included in the permitted beam information. The wireless node 300 then forms a beam on the basis of the information indicating the beam pattern according to the selected combination and transmits a transmission signal at the transmission power according to the combination with use of the beam. In a case where the information indicating the beam pattern is the precoding matrix, the weight matrix, or the steering vector, the wireless node 300 forms the beam by multiplying the transmission signal by these matrices. In a case where the information indicating the beam pattern is a combination of the elevation angle, the azimuth angle, and the beam width of the antenna, the wireless node 300 forms the beam by physically moving the antenna in accordance these parameters. It should be noted that the wireless node 300 is able to transmit the transmission signal at any transmission power equal to or lower than the permitted transmission power. The wireless node 300 may also select a plurality of permitted beams and simultaneously transmit the plurality of beams.

After selecting a beam to be transmitted (i.e., after selecting a beam pattern and a transmission power to be used) and before actually starting the transmission, the wireless node 300 may obtain a permission from the frequency administration database 100.

In this case, the wireless node 300 (e.g., processing section 353) first selects a beam to be transmitted on the basis of the permitted beam information. The wireless node 300 (e.g., notifying section 351) then notifies the frequency administration database 100 of information regarding the selected beam. Here, the information regarding the selected beam is information including one or more combinations of information indicating a selected beam pattern and information indicating a transmission power used for the use of the beam pattern.

The frequency administration database 100 (e.g., second acquiring section 132) acquires the information regarding the beam selected by each of the wireless nodes 300 on the basis of the permitted beam information. Subsequently, on the basis of the information regarding the beam selected by the wireless node 300, the frequency administration database 100 (e.g., determining section 134) determines whether or not the beam selected by the wireless node 300 is permitted to be used. For example, the frequency administration database 100 determines whether or not the selected beam is permitted to be used by evaluating whether or not the beam (i.e., the beam pattern and the transmission power) selected by the wireless node 300 is effective, whether or not the beam adversely affects another system, or the like. The frequency administration database 100 (e.g., notifying section 135) then notifies the wireless node 300 of information indicating whether or not the beam selected by the wireless node 300 is permitted to be used.

The wireless node 300 (e.g., acquiring section 352) acquires the information indicating whether or not the beam selected by the wireless node 300 is permitted to be used. Then, on the basis of the information indicating whether or not the beam is permitted to be used, the wireless node 300 (e.g., processing section 353) transmits a transmission signal with use of the beam permitted to be used.

Thus, before the wireless node 300 actually transmits a beam by, the frequency administration database 100 determines whether or not the beam is permitted to be used. This makes it possible to enhance reliability in restraining interference with another system such as the primary system.

(5) Flow of Process

An example of a flow of a process for the above-described beam management is described below with reference to FIG. 6.

FIG. 6 is a sequence diagram illustrating an example of the flow of the beam management process executed in the system 1 according to the present embodiment. This sequence involves the frequency administration database 100 and the wireless nodes 300.

As illustrated in FIG. 6, the frequency administration database 100 first acquires geolocation information of the datum point of the primary system and calculates or acquires an interference acceptable amount at the datum point (Step S102).

Further, each of the wireless nodes 300 notifies the wireless node 300 of geolocation information, antenna information, and beam pattern information of the wireless node 300 (Step S104). The beam pattern information indicates beam patterns usable by the wireless node 300. The frequency administration database 100 then determines permitted beam information of the wireless node 300 on the basis of the geolocation information of the datum point of the primary system, the interference acceptable amount at the datum point, and the geolocation information, antenna information, and beam pattern information of the wireless node 300 (Step S106). Subsequently, the frequency administration database 100 notifies the wireless node 300 of the determined permitted beam information of the wireless node 300 (Step S108).

The wireless node 300 selects a beam to be transmitted on the basis of the given permitted beam information (Step S110) and notifies the frequency administration database 100 of information regarding the selected beam (Step S112). The frequency administration database 100 determines whether or not the beam selected by the wireless node 300 is permitted to be used on the basis of the information regarding the beam selected by the wireless node 300 (Step S114). Subsequently, the frequency administration database 100 notifies the wireless node 300 of a determination result, that is, information indicating whether or not the beam selected by the wireless node 300 is permitted to be used (Step S116). The wireless node 300 then transmits a transmission signal with use of the beam permitted to be used by the frequency administration database 100 (Step S118).

3.2. Operation for Case where Number of Wireless Nodes is Increased

Subsequently, description is made regarding beam management performed in a case where the number of the wireless nodes 300 in use is increased.

During the operation of the wireless node 300, another wireless node 300 belonging to a second wireless operation (e.g., secondary system) or a third wireless operation (e.g., tertiary system) is sometimes newly put into operation. In this case, to protect the primary system, the frequency administration database 100 performs the above beam management process on the other wireless node 300. The wireless node 300 in operation is also referred to as first wireless node 300 hereinafter. The wireless node 300 newly put into operation is also referred to as second wireless node 300.

However, interference may occur between the first wireless node 300 and the second wireless node 300. At least one of the first wireless node 300 or the second wireless node 300 may fail to provide a sufficient communication quality depending on a magnitude of the interference. In addition, in a case where different frequency access priorities are set in the first wireless node 300 and the second wireless node 300, it is desirable to perform beam management by taking account of the frequency access priorities. It should be noted that the frequency access priority indicates a priority for the use of a secondarily usable frequency and a wireless node with a higher priority is allowed to secondarily use the frequency more preferentially.

Accordingly, the beam management for the first wireless node 300 and the second wireless node 300 is described below.

The frequency administration database 100 (e.g., third acquiring section 133) acquires geolocation information (corresponding to third geolocation information), antenna information (corresponding to second antenna information), and beam pattern information (corresponding to second beam pattern information) of the second wireless node 300. The beam pattern information indicates a beam pattern usable by the other wireless node 300. The respective contents of the geolocation information, antenna information, and beam pattern information are the same as described above.

The frequency administration database 100 (e.g., determining section 134) determines permitted beam information of the first wireless node 300 further on the basis of the geolocation information, antenna information, and beam pattern information of the second wireless node 300. If described in detail, the frequency administration database 100 first determines permitted beam information of the second wireless node 300 on the basis of the geolocation information and interference acceptable amount of the primary system and the geolocation information, antenna information, and beam pattern information of the second wireless node 300. Subsequently, the frequency administration database 100 compares the permitted beam information of the first wireless node 300 with the permitted beam information of the second wireless node 300. It should be noted that regarding the first wireless node 300, the frequency administration database 100 may compare information indicating a beam being used by the first wireless node 300 in addition to the permitted beam information or in place of the permitted beam information. In a case where the permitted beam information is compared, possible interference with the second wireless node 300 is evaluated for all the beams that may be transmitted by the first wireless node 300. Meanwhile, in the case of comparing the beam being used, possible interference with the second wireless node 300 is evaluated for a beam currently transmitted by the first wireless node 300. The frequency administration database 100 then modifies at least any one of the permitted beam information of the first wireless node 300 or the permitted beam information of the second wireless node 300 on the basis of a comparison result.

Specifically, on the basis of the geolocation information of the first wireless node 300 and the geolocation information of the second wireless node 300, the frequency administration database 100 first calculates a path-loss between these communication nodes. Subsequently, the frequency administration database 100 identifies beams that may adversely interfere with each other among permitted beams according to the permitted beam information of the first wireless node 300 and the permitted beam information of the second wireless node 300. For example, the frequency administration database 100 identifies, among beams transmittable from the first wireless node 300, a beam with an interference amount relative to the second wireless node 300 exceeding a predetermined threshold as the beam that may adversely interfere. For example, the predetermined threshold is acquired or calculated in a technique similar to that of the above interference acceptable amount. The frequency administration database 100 then reflects information indicating the identified beam that may adversely interfere in the permitted beam information. For example, the frequency administration database 100 deletes the information (a combination of the information indicating the beam pattern and the information indicating the transmission power) indicating the beam that may adversely interfere with the second wireless node 300 from the permitted beam information of the first wireless node 300. The same applies to the permitted beam information of the second wireless node 300.

Deleting the information of the beam that may adversely interfere with the other wireless node 300 from the permitted beam information makes it possible to prevent the wireless node 300 from transmitting the beam that may adversely interfere with the other wireless node 300. Thus, in a case where the second wireless node 300 is newly put into operation during the operation of the first wireless node 300, it is possible to prevent adverse interference between the first wireless node 300 and the second wireless node 300 while protecting the primary system.

Different frequency access priorities are sometimes set between the first wireless node 300 and the second wireless node 300. In this case, the frequency administration database 100 determines the permitted beam information of each of the first wireless node 300 and the second wireless node 300 further on the basis of the respective frequency access priorities of the first wireless node 300 and the second wireless node 300. Specifically, the frequency administration database 100 prohibits the wireless node 300 with a lower frequency access priority from transmitting a beam pointing in the direction toward the other wireless node 300. In other words, the frequency administration database 100 deletes, from the permitted beam information of the wireless node 300 with the lower frequency access priority, information indicating the beam pointing in the direction toward the other wireless node 300.

This makes it possible to prevent the wireless node 300 with the lower frequency access from transmitting the beam that may adversely interfere with the wireless node 300 with the higher frequency access priority. Thus, in a case where the second wireless node 300 is newly put into operation during the operation of the first wireless node 300, it is possible to prevent adverse interference with the wireless node 300 with the lower frequency access priority while protecting the primary system.

It should be noted that in a case where the beam permitted to the second wireless node 300 is difficult to identify or in a case where no beam is permitted, the frequency administration database 100 may refuse frequency use by the second wireless node 300.

An example of a flow of a process for the above-described beam management is described below with reference to FIG. 7.

Figure 7:
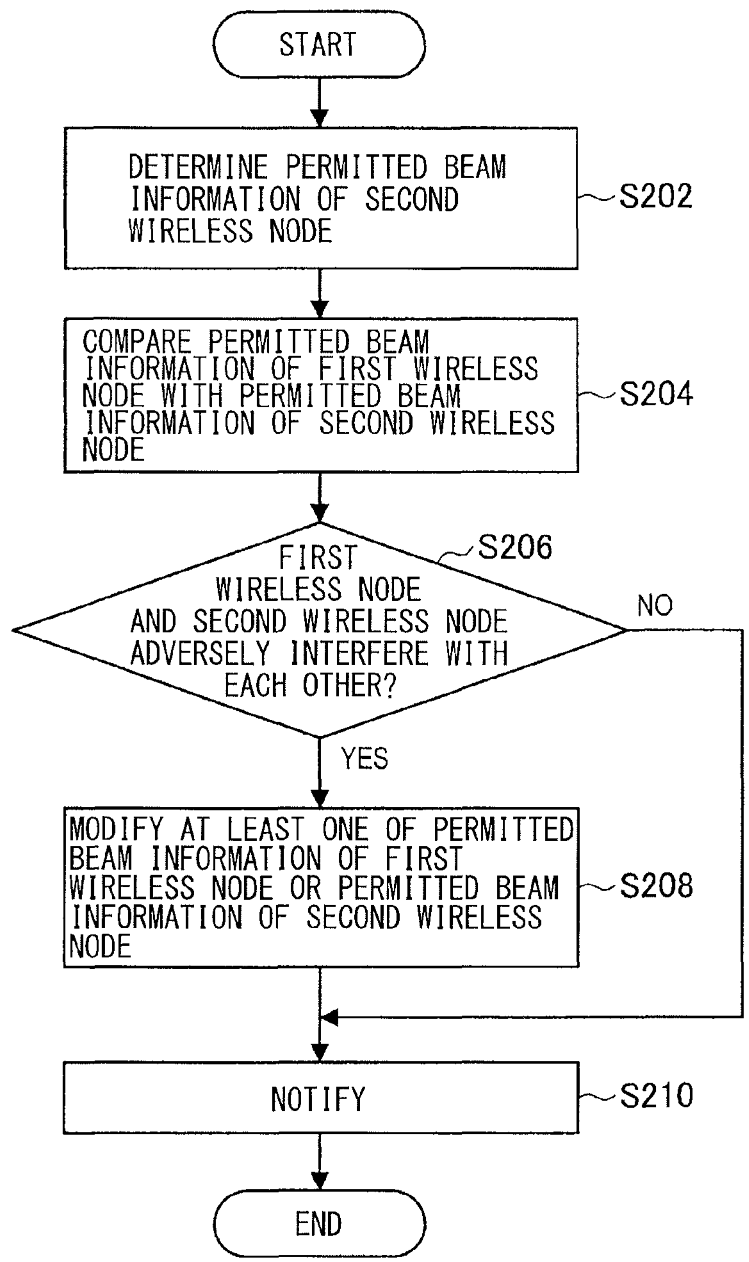
FIG. 7 is a flowchart illustrating an example of a flow of a beam management process executed by a frequency administration database according to the present embodiment.

FIG. 7 is a flowchart illustrating an example of the flow of the beam management process executed by the frequency administration database 100 according to the present embodiment. It should be noted that before this flow is performed, the frequency administration database 100 determines the permitted beam information of the first wireless node 300 and the wireless node 300 transmits the permitted beam on the basis of the permitted beam information.

As illustrated in FIG. 7, the frequency administration database 100 determines the permitted beam information of the second wireless node 300 (Step S202). Subsequently, the frequency administration database 100 compares the permitted beam information of the first wireless node 300 with the permitted beam information of the second wireless node 300 (Step S204). Subsequently, the frequency administration database 100 determines whether or not the first wireless node 300 and the wireless node 300 adversely interfere with each other (Step S206).

In a case where it is determined that the first wireless node 300 and the wireless node 300 adversely interfere with each other (Step S206/YES), the frequency administration database 100 modifies at least one of the permitted beam information of the first wireless node 300 or the permitted beam information of the second wireless node 300 (Step S208). For example, the frequency administration database 100 deletes, from one of the pieces of permitted beam information, information of the beam that may adversely interfere with the other wireless node 300. The frequency administration database 100 then notifies first wireless node 300 of the modified permitted beam information of the first wireless node 300 and notifies the second wireless node 300 of the modified permitted beam information of the second wireless node 300 (Step S210).

In contrast, in a case where it is determined that the first wireless node 300 and the wireless node 300 do not adversely interfere with each other (Step S206/NO), the frequency administration database 100 notifies the second wireless node 300 of the permitted beam information of the second wireless node 300 determined in Step S202 above (Step S210).

3.3. Application to Handover

Figure 8:
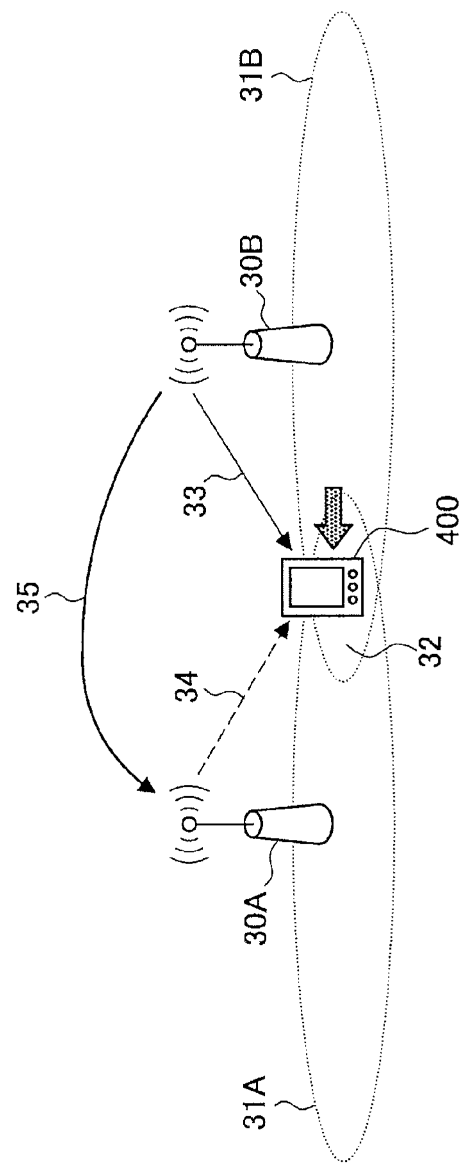
FIG. 8 is a diagram for describing typical handover.

FIG. 8 is a diagram for describing typical handover. As illustrated in FIG. 8, a base station 30A and a base station 30B are located adjacent to each other. The base station 30A manages a cell 31A and provides a wireless communication service to a terminal device located within the cell 31A without performing beam forming. Similarly, the base station 30B manages a cell 31B and provides a wireless communication service to a terminal device located within the cell 31B without performing beam forming. A cell edge 32 defined at a border portion between the cell 31A and the cell 31B is distant from both the base station 30A and the base station 30B. Thus, in a case where a terminal device 400 is located in the cell edge 32, handover is performed in accordance with a mobility of the terminal device 400.

For example, it is assumed that the terminal device 400 is coupled to the base station 30B and receives a signal 33 from the base station 30B. As the terminal device 400 is moved from a middle of the cell 31B to the cell edge 32, handover denoted by a reference sign 35 from the base station 30B to the base station 30A is performed. The terminal device 400 is then coupled to the base station 30A and receives a signal 34 from the base station 30A.

The example described above with reference to FIG. 8 is an example of handover in a case where a base station does not perform beam forming. In contrast, in a case where a terminal device that communicates with the wireless node 300 that performs beam forming performs handover, a problem that is not caused in a case where no beam forming is performed may be caused. This problem, and a method of solving this problem by the system 1 according to the present embodiment are described with reference to FIG. 9.

Figure 9:
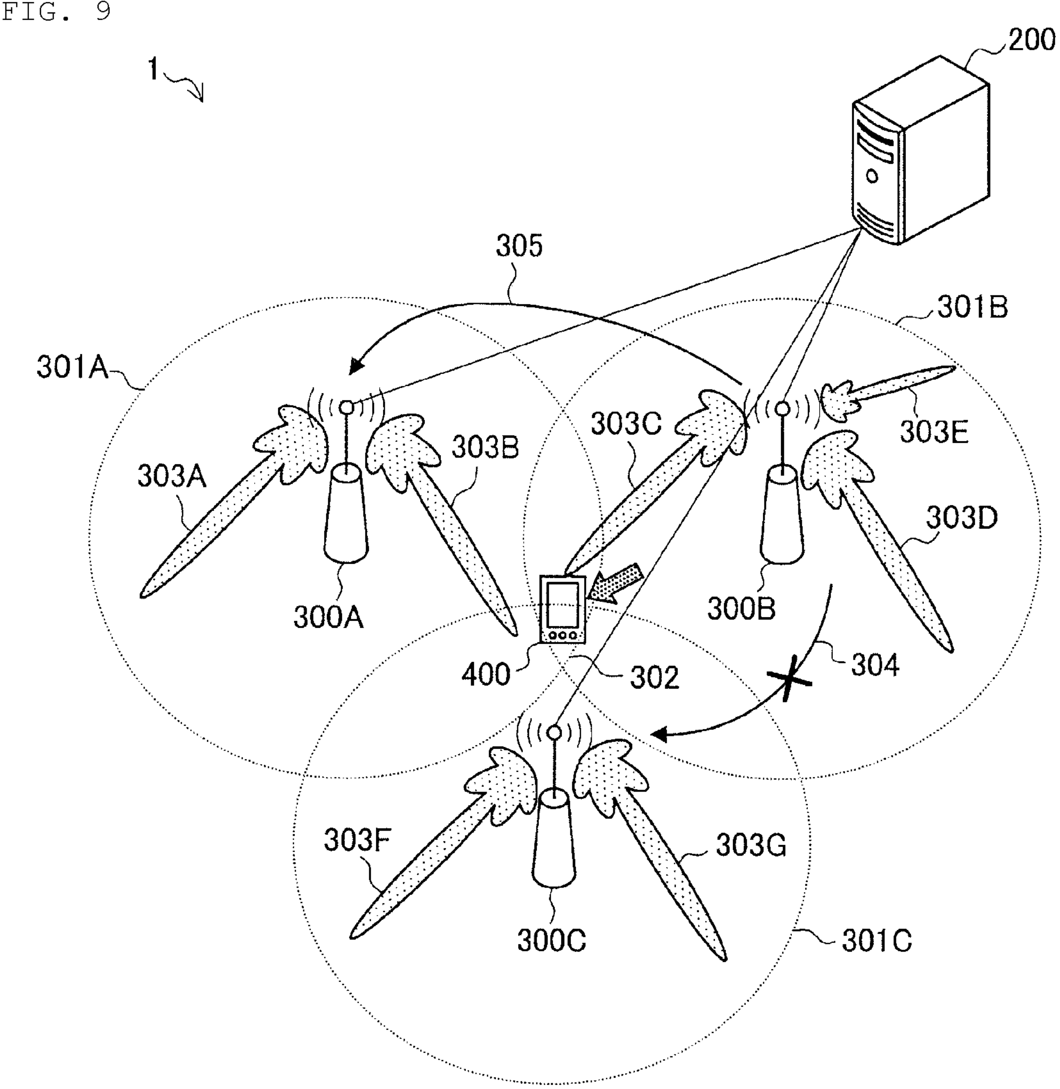
FIG. 9 is a diagram for describing an example of handover performed in the system according to the present embodiment.

FIG. 9 is a diagram for describing an example of handover performed in the system 1 according to the present embodiment. As illustrated in FIG. 9, the wireless nodes 300A, 300B, and 300C are located adjacent to one another. In the example illustrated in FIG. 9, each of the wireless nodes 300A to 300B is a base station that provides a wireless communication service by performing beam forming. If described in detail, the wireless node 300A manages a cell 301A and provides a wireless communication service to a terminal device located within the cell 301A with use of beams 303A and 303B. The wireless node 300B manages a cell 301B and provides a wireless communication service to a terminal device located within the cell 301B with use of beams 303C to 303E. The wireless node 300C manages a cell 301C and provides a wireless communication service to a terminal device located within the cell 301C with use of beams 303F and 303G. The wireless nodes 300A to 300C are coupled to the network manager 200 and operate on the basis of the control by the network manager 200. A cell edge 302 defined at a border portion between the cell 301A, the cell 301B, and the cell 301C is distant from any of the wireless nodes 300A to 300C. Thus, in a case where the terminal device 400 is located in the cell edge 302, handover is performed in accordance with a mobility of the terminal device 400.

For example, it is assumed that the terminal device 400 is coupled to the wireless node 300B and receives the beam 303C from the wireless node 300B. As the terminal device 400 is moved from a middle of the cell 301B to the cell edge 302, handover is performed from the wireless node 300B to one of the wireless node 300A or the wireless node 300C.

Here, while the wireless nodes 300A and 300B are each permitted to transmit a beam in a direction toward the wireless node 300C, the wireless node 300C is not permitted to transmit a beam in a direction toward the wireless node 300A or the wireless node 300B. A purpose of the above is to restrain interference of the wireless node 300C with the wireless node 300A or the wireless node 300B. Thus, as illustrated in FIG. 9, no beam is provided (or transmitted) to the cell edge 302 from the wireless node 300C. Consequently, if the wireless node 300C is selected as a target base station and handover denoted by a reference sign 304 from the wireless node 300B to the wireless node 300C is performed, the terminal device 400 is not allowed to continuously receive the beam before and after the handover. This causes the negative impact of difficulty in soft handover. The soft handover means that handover is performed while the wireless communication service is continued.

Accordingly, with use of the permitted beam information, the system 1 according to the present embodiment selects the wireless node 300A as the target base station for the terminal device 400 and performs handover as denoted by a reference sign 305 from the wireless node 300B to the wireless node 300A. As illustrated in FIG. 9, a beam is provided to the cell edge 302 from each of the wireless nodes 300A and 300B. This allows the terminal device 400 to continuously receive the beam before and after the handover, thus enabling soft handover. An operation during handover in the system 1 according to the present embodiment is described below in detail.

The frequency administration database 100 (e.g., notifying section 135) notifies another control device (i.e., network manager 200) of the permitted beam information of each of the wireless nodes 300A to 300C. The other control device (i.e., network manager 200) selects the wireless node 300 that is a destination of handover of the terminal device 400 that communicates with the wireless nodes 300A to 300C. The network manager 200 acquires the permitted beam information given by the frequency administration database 100.

Then, on the basis of the permitted beam information of each of the wireless nodes 300A to 300C, the network manager 200 selects the wireless node 300 that is the destination of handover of the terminal device 400. For example, on the basis of the permitted beam information of each of the wireless nodes 300A and 300B, the network manager 200 recognizes that the wireless nodes 300A and 300B are each permitted to provide a beam pointing in a direction toward the cell edge 302. In addition, on the basis of the permitted beam information of each of the wireless node 300C, the network manager 200 recognizes that the wireless node 300C is not permitted to provide a beam pointing in a direction toward the cell edge 302. The network manager 200 then selects the wireless node 300A that is permitted to provide the beam pointing in the direction toward the cell edge 302, as the wireless node 300 that is the destination of handover of the terminal device 400.

The network manager 200 notifies the wireless node 300B that the wireless node 300A is selected as the destination of handover. In other words, the network manager 200 starts a procedure for handover from the wireless node 300B to the wireless node 300A. The handover from the wireless node 300B to the wireless node 300A is thus achieved.

The network manager 200 may notify the wireless node 300A of information indicating a beam to be used. For example, the network manager 200 instructs the wireless node 300A to use the beam pointing in the direction toward the cell edge 302. This allows the terminal device 400 to continuously receive the beam before and after the handover with higher reliability.

An example of a flow of a process for beam management for the handover described above with reference to FIG. 9 is described below with reference to FIG. 10.

FIG. 10 is a sequence diagram illustrating an example of the flow of the beam management process for the handover executed in the system 1 according to the present embodiment. This sequence involves the wireless node 300B, the wireless node 300A, the network manager 200, and the frequency administration database 100.

As illustrated in FIG. 10, the network manager 200 first notifies the frequency administration database 100 of a usable frequency information request (Step S302). Subsequently, the frequency administration database 100 notifies the network manager 200 of the requested usable frequency information (Step S304). The usable frequency information is information regarding a frequency secondarily usable by each of the wireless nodes 300. In the present embodiment, the usable frequency information includes the permitted beam information of each of the wireless nodes 300. The network manager 200 requests the usable frequency information of each of the wireless nodes 300A to 300C under management and acquires the usable frequency information of each of the wireless nodes 300A to 300C. The usable frequency information includes the permitted beam information.

Next, the network manager 200 performs operation parameter setting for each of the wireless nodes 300A and 300B (Step S306). For example, the operation parameter setting includes setting or the like of a frequency to be used. In the present embodiment, the operation parameter setting includes information indicating a beam to be used. The wireless nodes 300A and 300B each use the beam indicated by the network manager 200 to provide the wireless communication service to the terminal device within the cell.

Subsequently, the network manager 200 recognizes movement of the terminal device 400 (Step S308). Here, the network manager 200 recognizes that the terminal device 400 that is coupled to the wireless node 300B and is in operation is moved to the cell edge 302. At this time, the network manager 200 may recognize the movement by acquiring mobility information of the terminal device 400 from an entity (e.g., MME (Mobility Management Entity) according to LTE) that manages the mobility of the terminal device 400.

Next, the network manager 200 determines the wireless node 300 that is a destination of handover (Step S310). If described in detail, on the basis of the permitted beam information of each of the wireless nodes 300A to 300C, the network manager 200 selects the wireless node 300A that is permitted to provide the beam pointing in the direction toward the cell edge 302, as the wireless node 300 that is the destination of handover of the terminal device 400.

Next, the network manager 200 notifies the wireless node 300A of an operation parameter modification command including the information indicating the beam to be used (Step S312). For example, the network manager 200 instructs the wireless node 300A to provide the beam to the cell edge 302.

Further, the network manager 200 notifies the wireless node 300B of a handover procedure start command indicating that the wireless node 300A is the destination of handover (Step S314). The wireless nodes 300A and 300B then perform the handover procedure.

4. Application Examples

The technology according to the present disclosure is applicable to various products. For example, the frequency administration database 100 or the network manager 200 may be achieved as any type of server such as a tower server, a rack server, or a blade server. In addition, the frequency administration database 100 or the network manager 200 may be a control module (e.g., integrated circuit module that includes one die, or card or blade that is inserted into a slot of a blade server) mounted on a server.

Further, the wireless node 300 may be achieved as any type of eNB (evolved Node B) such as macro eNB or small eNB. The small eNB may be eNB such as pico eNB, micro eNB, or home (femto) eNB that covers a cell smaller than a macro cell. Instead, the wireless node 300 may be achieved as another type of base station such as Node B or BTS (Base Transceiver Station). The wireless node 300 may include the main device (also referred to as base station device) that controls wireless communication and one or more RRHs (Remote Radio Heads) that are disposed at different locations from that of the main device. In addition, various types of terminals described below may function as the wireless node 300 by temporarily or semi-permanently executing the base station function.

Figure 11:
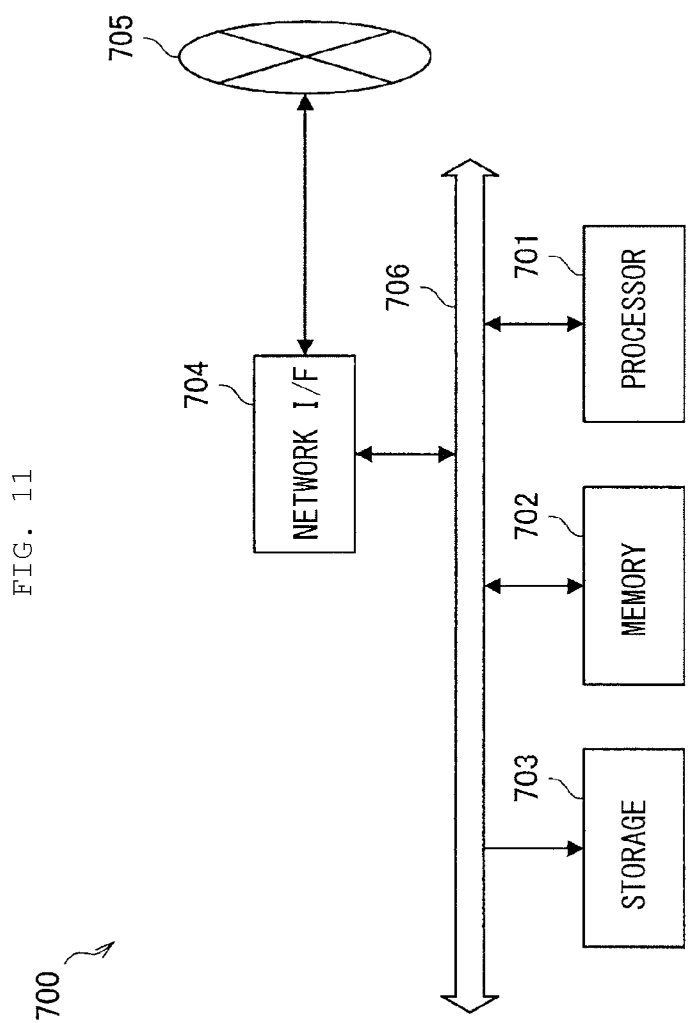
FIG. 11 is a block diagram illustrating a schematic configuration of a server.

FIG. 11 is a block diagram illustrating an example of a schematic configuration of a server 700 to which the technology of the present disclosure may be applied. The server 700 includes a processor 701, a memory 702, a storage 703, a network interface 704, and a bus 706.

The processor 701 may be, for example, CPU (Central Processing Unit) or DSP (Digital Signal Processor), and controls various functions of the server 700. The memory 702 includes RAM (Random Access Memory) and ROM (Read Only Memory), and stores programs executed by the processor 701 and data. The storage 703 may include a storage medium such as a semiconductor memory or a hard disk.

The network interface 704 is a wired communication interface for coupling the server 700 to a wired communication network 705. The wired communication network 705 may be a core network such as EPS (Evolved Packet Core) or PDN (Packet Data Network) such as the Internet.

The bus 706 couples the processor 701, the memory 702, the storage 703, and the network interface 704 to each other. The bus 706 may include two or more buses are different in speed (e.g., high-speed bus and low-speed bus).

In the server 700 illustrated in FIG. 11, one or more components (the first acquiring section 131, the second acquiring section 132, the third acquiring section 133, the determining section 134, and/or notifying section 135) included in the control unit 130 described with reference to FIG. 4 may be implemented in the processor 701. As an example, a program for causing a processor to function as the one or more components described above (i.e., a program for causing a processor to execute operations of the one or more components described above) may be installed in the server 700 and the processor 701 may execute the program. As another example, a module including the processor 701 and the memory 702 may be mounted in the server 700 and the one or more components may be implemented by the module. In this case, the above module may store a program for causing a processor to function as the one or more components described above in the memory 702 and the program may be executed by the processor 701. The server 700 or the above module may be provided as a device including the one or more components described above as described above, or the above program for causing a processor to function as the one or more components described above may be provided. In addition, a readable recording medium having the above-described program recorded thereon may be provided.

Moreover, for example, the network communication unit 110 described with reference to FIG. 4 may be implemented in the network interface 704 in the server 700 illustrated in FIG. 11. Moreover, the storage unit 120 may be implemented in the memory 702 and/or the storage 703.

4.2. Application Example Regarding Wireless Node

First Application Example

Figure 12:
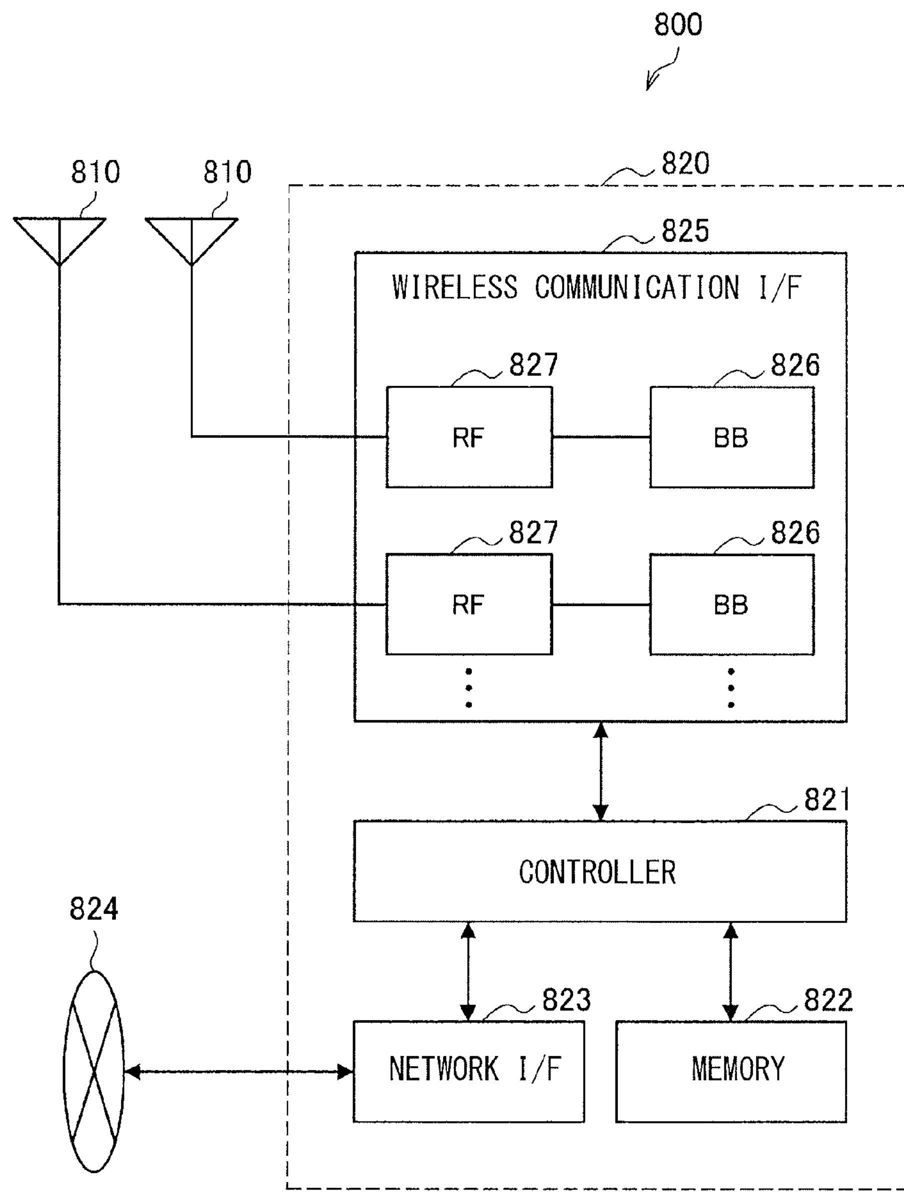
FIG. 12 is a block diagram illustrating a first example of a schematic configuration of eNB.

FIG. 12 is a block diagram illustrating a first example of a schematic configuration of eNB to which the technology according to the present disclosure may be applied. eNB 800 includes one or more antennas 810 and a base station device 820. Each antenna 810 and the base station device 820 may be coupled to each other via an RF cable.

Each of the antennas 810 includes a single or a plurality of antenna elements (e.g., a plurality of antenna elements included in a MIMO antenna) and is used for the base station device 820 to transmit and receive wireless signals. The eNB 800 may include the plurality of antennas 810 as illustrated in FIG. 12, and the plurality of respective antennas 810 may correspond, for example, to a plurality of frequency bands used by the eNB 800. It should be noted that FIG. 12 illustrates an example in which the eNB 800 includes the plurality of antennas 810, but the eNB 800 may include the single antenna 810.

The base station device 820 includes a controller 821, a memory 822, a network interface 823, and a wireless communication interface 825.

The controller 821 may be, for example, CPU or DSP, and operates various functions of an upper layer of the base station device 820. For example, the controller 821 generates a data packet from data in a signal processed by the wireless communication interface 825, and transfers the generated packet via the network interface 823. The controller 821 may generate a bundled packet by bundling data from a plurality of base band processors, and transfer the generated bundled packet. In addition, the controller 821 may also have a logical function of executing control such as radio resource control (Radio Resource Control), radio bearer control (Radio Bearer Control), mobility management (Mobility Management), admission control (Admission Control), or scheduling (Scheduling). The control may be executed in cooperation with nearby eNB or a core network node. The memory 822 includes RAM and ROM, and stores a program executed by the controller 821 and various kinds of control data (e.g., terminal list, transmission power data, scheduling data, and the like).

The network interface 823 is a communication interface for coupling the base station device 820 to the core network 824. The controller 821 may communicate with a core network node or another eNB via the network interface 823. In this case, the eNB 800 and a core network node or another eNB may be coupled to each other through a logical interface (e.g., S1 interface or X2 interface). The network interface 823 may be a wired communication interface or a wireless communication interface for wireless backhaul. In a case where the network interface 823 is a wireless communication interface, the network interface 823 may use a higher frequency band for wireless communication than a frequency band used by the wireless communication interface 825.

The wireless communication interface 825 supports any cellular communication scheme such as LTE (Long Term Evolution) or LTE-Advanced, and provides wireless coupling to a terminal located within the cell of the eNB 800 via the antenna 810. The wireless communication interface 825 may typically include a base band (BB) processor 826, an RF circuit 827, and the like. The BB processor 826 may perform, for example, encoding/decoding, modulation/demodulation, multiplexing/demultiplexing, and the like, and executes various signal processes on each layer (e.g., L1, MAC (Medium Access Control), RLC (Radio Link Control), and PDCP (Packet Data Convergence Protocol)). The BB processor 826 may have a portion or all of the logical functions described above instead of the controller 821. The BB processor 826 may be a module including a memory having a communication control program stored therein, a processor to execute the program, and a related circuit, and the function of the BB processor 826 may be modifiable by updating the program. In addition, the module described above may be a card or blade to be inserted into a slot of the base station device 820, or a chip mounted on the card or blade described above. Meanwhile, the RF circuit 827 may include a mixer, a filter, an amplifier, and the like, and transmits and receives wireless signals via the antenna 810.

The wireless communication interface 825 may include the plurality of BB processors 826 as illustrated in FIG. 12, and the plurality of respective BB processors 826 may correspond, for example, to a plurality of frequency bands used by the eNB 800. Further, the wireless communication interface 825 may also include the plurality of RF circuits 827 as illustrated in FIG. 12, and the plurality of respective RF circuits 827 may correspond, for example, to a plurality of antenna elements. It should be noted that FIG. 12 illustrates an example in which the wireless communication interface 825 includes the plurality of BB processors 826 and the plurality of RF circuits 827, but the wireless communication interface 825 may also include the single BB processor 826 or the single RF circuit 827.

In the eNB 800 illustrated in FIG. 12, one or more components (the notifying section 351, the acquiring section 352, and/or the processing section 353) included in the control unit 350 described with reference to FIG. 5 may be implemented in the wireless communication interface 825. Alternatively, at least a portion of these components may be implemented in the controller 821. As an example, the eNB 800 may include a module including a portion (e.g., BB processor 826) or all of components of the wireless communication interface 825 and/or the controller 821, and the one or more components described above may be implemented in the module. In this case, the module described above may store a program for causing the processor to function as the one or more components described above (i.e., a program for causing the processor to execute the operations of the one or more components described above) and execute the program. As another example, a program for causing the processor to function as the one or more components described above may be installed in the eNB 800, and the wireless communication interface 825 (e.g., BB processor 826) and/or the controller 821 may execute the program. As described above, the eNB 800, the base station device 820, or the module described above may be provided as a device including the one or more components described above, and the program for causing the processor to function as the one or more components described above may be provided. In addition, a readable recording medium having the above-described program recorded thereon may be provided.

In addition, in the eNB 800 illustrated in FIG. 12, the wireless communication unit 320 described with reference to FIG. 5 may be implemented in the wireless communication interface 825 (e.g., RF circuit 827). Moreover, the antenna unit 310 may be implemented in the antenna 810. In addition, the network communication unit 330 may be implemented in the controller 821 and/or the network interface 823. In addition, the storage unit 340 may be implemented in the memory 822.

Second Application Example

Figure 13:
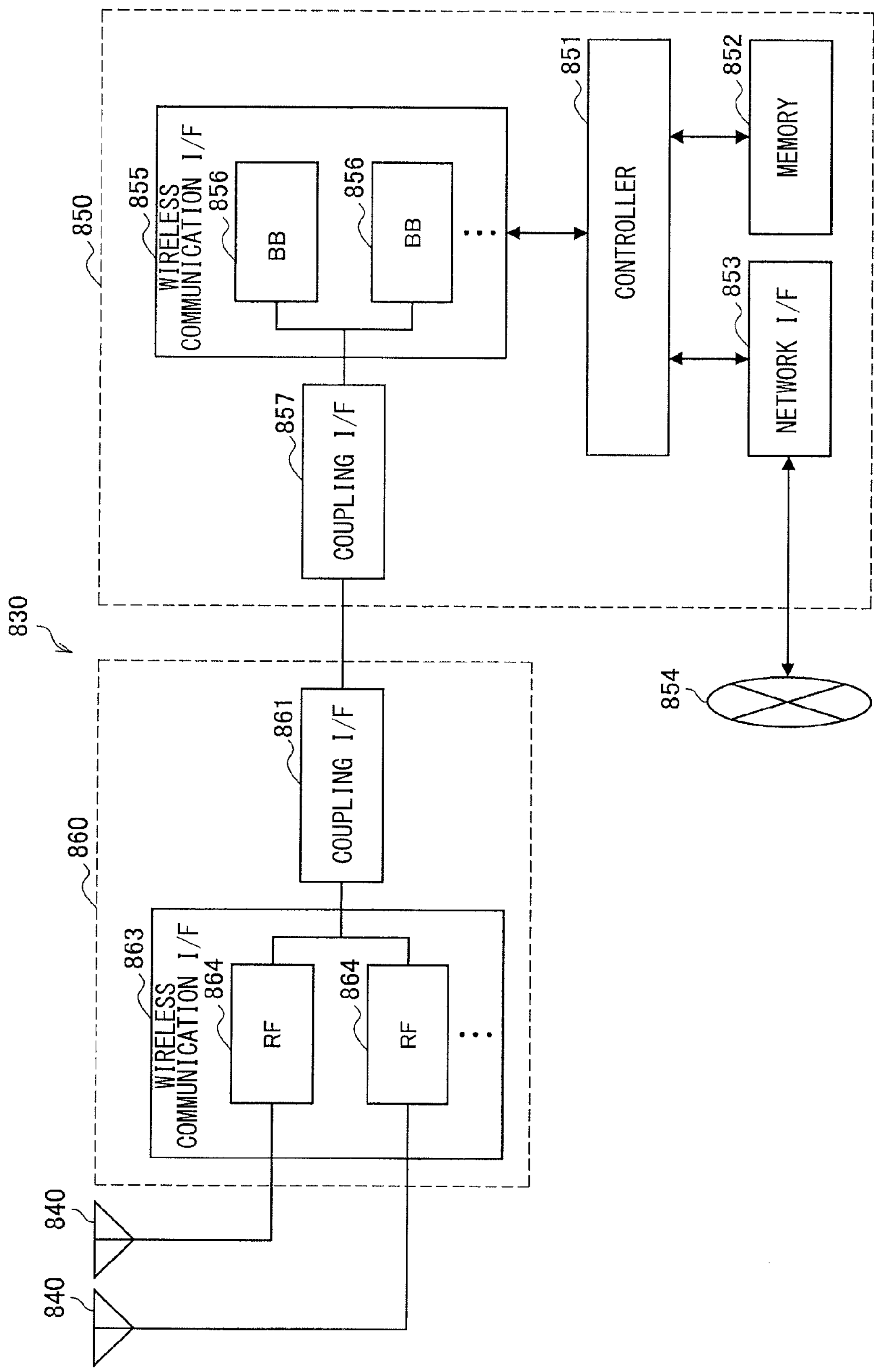
FIG. 13 is a block diagram illustrating a second example of the schematic configuration of the eNB.

FIG. 13 is a block diagram illustrating a second example of a schematic configuration of eNB to which the technology according to the present disclosure may be applied. eNB 830 includes one or more antennas 840, a base station device 850, and RRH 860. Each antenna 840 and the RRH 860 may be coupled to each other via an RF cable. In addition, the base station device 850 and the RRH 860 may be coupled to each other by a high-speed line such as an optical fiber cable.

Each of the antennas 840 includes a single or a plurality of antenna elements (e.g., a plurality of antenna elements included in a MIMO antenna) and is used for the RRH 860 to transmit and receive wireless signals. The eNB 830 may include the plurality of antennas 840 as illustrated in FIG. 13, and the plurality of respective antennas 840 may correspond, for example, to a plurality of frequency bands used by the eNB 830. It should be noted that FIG. 13 illustrates an example in which the eNB 830 includes the plurality of antennas 840, but the eNB 830 may include the single antenna 840.

The base station device 850 includes a controller 851, a memory 852, a network interface 853, a wireless communication interface 855, and a coupling interface 857. The controller 851, the memory 852, and the network interface 853 are similar to the controller 821, the memory 822, and the network interface 823 described with reference to FIG. 12.

The wireless communication interface 855 supports any cellular communication scheme such as LTE and LTE-Advanced, and provides wireless coupling to a terminal located in a sector corresponding to the RRH 860 via the RRH 860 and the antenna 840. The wireless communication interface 855 may typically include a BB processor 856 and the like. The BB processor 856 is similar to the BB processor 826 described with reference to FIG. 12 except that the BB processor 856 is coupled to an RF circuit 864 of the RRH 860 via the coupling interface 857. The wireless communication interface 855 may include the plurality of BB processors 856 as illustrated in FIG. 13, and the plurality of respective BB processors 856 may correspond, for example, to a plurality of frequency bands used by the eNB 830. It should be noted that FIG. 13 illustrates an example in which the wireless communication interface 855 includes the plurality of BB processors 856, but the wireless communication interface 855 may also include the single BB processor 856.

The coupling interface 857 is an interface for coupling the base station device 850 (wireless communication interface 855) to the RRH 860. The coupling interface 857 may be a communication module for communication on the above-described high-speed line in which couples the base station device 850 (wireless communication interface 855) and the RRH 860 to each other.

Further, the RRH 860 includes a coupling interface 861 and a wireless communication interface 863.

The coupling interface 861 is an interface for coupling the RRH 860 (wireless communication interface 863) to the base station device 850. The coupling interface 861 may be a communication module for communication on the high-speed line described above.

The wireless communication interface 863 transmits and receives wireless signals via the antenna 840. The wireless communication interface 863 may typically include the RF circuit 864 and the like. The RF circuit 864 may include a mixer, a filter, an amplifier, and the like, and transmits and receives wireless signals via the antenna 840. The wireless communication interface 863 may also include the plurality of RF circuits 864 as illustrated in FIG. 13, and the plurality of respective RF circuits 864 may correspond, for example, to a plurality of antenna elements. It should be noted that FIG. 13 illustrates an example in which the wireless communication interface 863 includes the plurality of RF circuits 864, but the wireless communication interface 863 may also include the single RF circuit 864.

In the eNB 830 illustrated in FIG. 13, one or more components (the notifying section 351, the acquiring section 352, and/or the processing section 353) included in the control unit 350 described with reference to FIG. 5 may be implemented in the wireless communication interface 855 and/or the wireless communication interface 863. Alternatively, at least a portion of these components may be implemented in the controller 851. As an example, the eNB 830 may include a module including a portion (e.g., BB processor 856) or all of components of the wireless communication interface 855 and/or the controller 851, and the one or more components described above may be implemented in the module. In this case, the module described above may store a program for causing the processor to function as the one or more components described above (i.e., a program for causing the processor to execute the operations of the one or more components described above) and execute the program. As another example, a program for causing the processor to function as the one or more components described above may be installed in the eNB 830, and the wireless communication interface 855 (e.g., BB processor 856) and/or the controller 851 may execute the program. As described above, the eNB 830, the base station device 850, or the module described above may be provided as a device including the one or more components described above, and the program for causing the processor to function as the one or more components described above may be provided. In addition, a readable recording medium having the above-described program recorded thereon may be provided.

In addition, in the eNB 830 illustrated in FIG. 13, for example, the wireless communication unit 320 described with reference to FIG. 5 may be implemented in the wireless communication interface 863 (e.g., RF circuit 864). Moreover, the antenna unit 310 may be implemented in the antenna 840. In addition, the network communication unit 330 may be implemented in the controller 851 and/or the network interface 853. In addition, the storage unit 340 may be implemented in the memory 852.

5. Summary

The embodiment of the present disclosure has been described above in detail with reference to FIGS. 1 to 13. As described above, the frequency administration database 100 according to the present embodiment acquires the geolocation information of the datum point for the interference calculation of the primary system and calculates or acquires the interference acceptable amount at the datum point. Moreover, the frequency administration database 100 acquires the geolocation information, antenna information, and beam pattern information of each of the wireless nodes 300 belonging to the secondary system. The beam pattern information indicates beam patterns usable by the wireless node 300. Subsequently, on the basis of these acquired or calculated pieces of information, the frequency administration database 100 determines the permitted beam information that is information regarding a beam permitted to the wireless node 300. Then, the frequency administration database 100 notifies the wireless node 300 or the network manager 200 of the determined permitted beam information. The wireless node 300 is under the management of the network manager 200.

Thus, in the present embodiment, the information regarding the permitted beam is determined for the wireless node 300 that secondarily uses a frequency and performs beam forming. This enables flexible beam management that restrains the use of a beam against which protection of another system such as the primary system is difficult among beams usable by the wireless nodes 300 and permits the use of a beam against which the protection is possible.

A preferred embodiment(s) of the present disclosure has/have been described above in detail with reference to the accompanying drawings, but the technical scope of the present disclosure is not limited to such an embodiment(s). A person skilled in the art may find various alterations and modifications within the scope of the appended claims, and it should be understood that they will naturally come under the technical scope of the present disclosure.

For example, in the above embodiment, it is described that the frequency administration database 100 is a control device that performs control for secondary use of frequency including beam management by taking account of beam forming by the wireless node 300, but the present technology is not limited to the example. For example, a device closer to the wireless node 300 may operate as the above control device. For example, the network manager 200 may operate as the above control device. Alternatively, an MEC (Mobile Edge Computing) server may operate as the above control device.

Moreover, in the above embodiment, it is described that the wireless node 300 acquires the permitted beam information by notifying the frequency administration database 100 of information of the wireless node 300 and selects a beam to be transmitted, but the present technology is not limited to the example. For example, the network manager 200 may acquire the permitted beam information by notifying the frequency administration database 100 of the information of the wireless node 300 under management and select a beam to be transmitted. In this case, the network manager 200 notifies the wireless node 300 of information indicating the beam to be transmitted and the wireless node 300 transmits the beam specified by the notification.

Moreover, in the above embodiment, it is described that the frequency administration database 100 has a database function to retain the information regarding the primary system and serves as a control device that determines the permitted beam information, but the present technology is not limited to the example. The database function of the frequency administration database 100 to retain the information regarding the primary system and the control device that determines the permitted beam information may be independently provided. For example, the wireless node 300 or the network manager 200 may include the control device, and the wireless node 300 or the network manager 200 may determine the permitted beam information by itself.

Moreover, the control device that determines the permitted beam information may communicate with another control device to determine the permitted beam information to achieve coexistence of the wireless nodes 300 to be controlled by these control devices. For example, the control device may acquire location information, coverage information, etc. of the wireless node 300 from the other control device and determine the permitted beam information that achieves the coexistence by dealing with the information as the primary system and performing a procedure similar to that of the above embodiment.

In addition, the processes described by using the flowcharts and the sequence diagrams in this specification do not necessarily have to be executed in the illustrated order. Some of the processing steps may be executed in parallel. In addition, an additional processing step may be adopted, and a portion of the processing steps may be omitted.

Furthermore, the effects described herein are merely illustrative or exemplary, but not limitative. That is, the technology according to the present disclosure may exert other effects that are apparent to those skilled in the art from the description herein, in addition to the above-described effects or in place of the above-described effects.

It should be noted that the following configurations also fall within the technical scope of the present disclosure.

(1)

A control device including:

a first acquiring section that acquires first geolocation information of a datum point for interference calculation of a first wireless operation and calculates or acquires an interference acceptable amount at the datum point;

a second acquiring section that acquires second geolocation information, first antenna information, and first beam pattern information of a wireless device belonging to a second wireless operation that shares a portion or all of a frequency assigned to the first wireless operation, the first beam pattern information indicating a beam pattern usable by the wireless device;

a determining section that determines information regarding a beam permitted to the wireless device on the basis of the first geolocation information and the interference acceptable amount of the datum point, and the second geolocation information, the first antenna information, and the first beam pattern information of the wireless device; and a notifying section that notifies the wireless device or a device related to the wireless device of the information regarding the beam permitted to the wireless device.

(2)

The control device according to (1), in which the information regarding the beam permitted to the wireless device includes information including one or more combinations of information indicating a permitted beam pattern and information indicating a transmission power permitted for use of the beam pattern.

(3)

The control device according to (2), in which the information regarding the beam permitted to the wireless device is associated with a frequency.

(4)

The control device according to (3), in which the frequency is included in 70/80-GHz bands.

(5)

The control device according to any one of (1) to (4), in which the first beam pattern information includes at least one of a codebook including one or more precoding matrices, a weight matrix, a steering vector, or a combination of an elevation angle, an azimuth angle, and a beam width of an antenna.

(6)

The control device according to any one of (1) to (5), in which the determining section determines a combination of beams not permitted to be transmitted in combination among a plurality of beams permitted to the wireless device and reflects a determination result in the information regarding the beam permitted to the wireless device.

(7)

The control device according to any one of (1) to (6), in which the second acquiring section acquires information regarding a beam selected by the wireless device on the basis of the information regarding the beam permitted to the wireless device, and the notifying section notifies the wireless device of information indicating whether or not the beam selected by the wireless device is permitted to be used.

(8)

The control device according to any one of (1) to (7), further including a third acquiring section that acquires third geolocation information, second antenna information, and second beam pattern information of another wireless device belonging to the second wireless operation or a third wireless operation, the second beam pattern information indicating a beam pattern usable by the other wireless device, in which the determining section determines the information regarding the beam permitted to the wireless device further on the basis of the third geolocation information, the second antenna information, and the second beam pattern information of the other wireless device.

(9)

The control device according to (8), in which the determining section deletes information indicating a beam with an interference amount relative to the other wireless device exceeding a predetermined threshold from the information regarding the beam permitted to the wireless device.

(10)

The control device according to (8) or (9), in which the determining section determines the information regarding the beam permitted to the wireless device further on the basis of a frequency access priority of each of the wireless device and the other wireless device.

(11)

The control device according to any one of (1) to (10), in which the notifying section notifies another control device of the information regarding the beam permitted to the wireless device, the other control device selecting another wireless device that is a destination of handover of a terminal device that communicates with the wireless device.

(12)

A wireless device that operates on the basis of control by a control device, the wireless device belonging to a second operation that shares a portion or all of a frequency assigned to a first wireless operation, the wireless device including:

a notifying section that notifies the control device of second geolocation information, first antenna information, and first beam pattern information of the wireless device, the first beam pattern information indicating a beam pattern usable by the wireless device;

an acquiring section that acquires information regarding a beam permitted to the wireless device, the information regarding the beam permitted to the wireless device being determined by the control device on the basis of first geolocation information of a datum point for interference calculation of the first wireless operation, an interference acceptable amount at the datum point, and the second geolocation information, the first antenna information, and the first beam pattern information of the wireless device; and a processing section that transmits a beam on the basis of the information regarding the beam permitted to the wireless device.

(13)

The wireless device according to (12), in which the processing section selects a beam to be transmitted on the basis of the information regarding the beam permitted to the wireless device, the notifying section notifies the control device of information regarding the beam selected by the processing section, and the acquiring section acquires information indicating whether or not the beam selected by the processing section is permitted to be used.

(14)

A method including:

acquiring first geolocation information of a datum point for interference calculation of a first wireless operation and calculating or acquiring an interference acceptable amount at the datum point;

acquiring second geolocation information, first antenna information, and first beam pattern information of a wireless device belonging to a second wireless operation that shares a portion or all of a frequency assigned to the first wireless operation, the first beam pattern information indicating a beam pattern usable by the wireless device;

determining, by a processor, information regarding a beam permitted to the wireless device on the basis of the first geolocation information and the interference acceptable amount of the datum point, and the second geolocation information, the first antenna information, and the first beam pattern information of the wireless device; and notifying the wireless device or a device related to the wireless device of the information regarding the beam permitted to the wireless device.

(15)

A method including:

notifying a control device of second geolocation information, first antenna information, and first beam pattern information of a wireless device that operates on the basis of control by the control device, the wireless device belonging to a second operation that shares a portion or all of a frequency assigned to a first wireless operation, the first beam pattern information indicating a beam pattern usable by the wireless device;

acquiring information regarding a beam permitted to the wireless device, the information regarding the beam permitted to the wireless device being determined by the control device on the basis of first geolocation information of a datum point for interference calculation of the first wireless operation, an interference acceptable amount at the datum point, and the second geolocation information, the first antenna information, and the first beam pattern information of the wireless device; and transmitting, by a processor, a beam on the basis of the information regarding the beam permitted to the wireless device.

(16)

A recording medium having a program recorded thereon, the program causing a computer to function as a first acquiring section that acquires first geolocation information of a datum point for interference calculation of a first wireless operation and calculates or acquires an interference acceptable amount at the datum point, a second acquiring section that acquires second geolocation information, first antenna information, and first beam pattern information of a wireless device belonging to a second wireless operation that shares a portion or all of a frequency assigned to the first wireless operation, the first beam pattern information indicating a beam pattern usable by the wireless device, a determining section that determines information regarding a beam permitted to the wireless device on the basis of the first geolocation information and the interference acceptable amount of the datum point, and the second geolocation information, the first antenna information, and the first beam pattern information of the wireless device, and a notifying section that notifies the wireless device or a device related to the wireless device of the information regarding the beam permitted to the wireless device.

(17)

A recording medium having a program recorded thereon, the program causing a computer to function as a notifying section that notifies a control device of second geolocation information, first antenna information, and first beam pattern information of a wireless device that operates on the basis of control by the control device, the wireless device belonging to a second operation that shares a portion or all of a frequency assigned to a first wireless operation, the first beam pattern information indicating a beam pattern usable by the wireless device, an acquiring section that acquires information regarding a beam permitted to the wireless device, the information regarding the beam permitted to the wireless device being determined by the control device on the basis of first geolocation information of a datum point for interference calculation of the first wireless operation, an interference acceptable amount at the datum point, and the second geolocation information, the first antenna information, and the first beam pattern information of the wireless device, and a processing section that transmits a beam on the basis of the information regarding the beam permitted to the wireless device.

REFERENCE SIGNS LIST

1 System
100 Frequency administration database
110 Network communication unit
120 Storage unit
130 Control unit
131 First acquiring section
132 Second acquiring section
133 Third acquiring section
134 Determining section
135 Notifying section
200 Network manager
300 Wireless node
310 Antenna unit
320 Wireless communication unit
330 Network communication unit
340 Storage unit
350 Control unit
351 Notifying section
352 Acquiring section
353 Processing section

The invention claimed is:

1. A control device comprising:

a first acquiring section that acquires first geolocation information of a datum point for interference calculation of a first wireless operation and calculates or acquires an interference acceptable amount at the datum point;

a second acquiring section that acquires second geolocation information, first antenna information, and first beam pattern information of a wireless device belonging to a second wireless operation that shares a portion or all of a frequency assigned to the first wireless operation, the first beam pattern information indicating a beam pattern usable by the wireless device;

a determining section that determines information regarding a beam permitted to the wireless device on a basis of the first geolocation information and the interference acceptable amount of the datum point, and the second geolocation information, the first antenna information, and the first beam pattern information of the wireless device; and a notifying section that notifies the wireless device or a device related to the wireless device of the information regarding the beam permitted to the wireless device.

2. The control device according to claim 1, wherein the information regarding the beam permitted to the wireless device includes information including one or more combinations of information indicating a permitted beam pattern and information indicating a Iran mission power permitted for use of the beam pattern.

3. The control device according to claim 2, wherein the information regarding the beam permitted to the wireless device is associated with a frequency.

4. The control device according to claim 3, wherein the frequency is included in 70/80-GHz bands.

5. The control device according to claim 1, wherein the first beam pattern information includes at least one of a codebook including one or more preceding matrices, a weight matrix, a steering vector, or a combination of an elevation angle, an azimuth angle, and a beam width of an antenna.

6. The control device according to claim 1, wherein the determining section determines a combination of beams not permitted to be transmitted in combination among a plurality of beams permitted to the wireless device and reflects a determination result in the information regarding the beam permitted to the wireless device.

7. The control device according to claim 1, wherein the second acquiring section acquires information regarding a beam selected by the wireless device on a basis of the information regarding the beam permitted to the wireless device, and the notifying section notifies the wireless device of information indicating whether or not the beam selected by the wireless device is permitted to be used.

8. The control device according to claim 1, further comprising a third acquiring section that acquires third geolocation information, second antenna information, and second beam pattern information of another wireless device belonging to the second wireless operation or a third wireless operation, the second beam pattern information indicating a beam pattern usable by the other wireless device, wherein the determining section determines the information regarding the beam permitted to the wireless device further on a basis of the third geolocation information, the second antenna information, and the second beam pattern information of the other wireless device.

9. The control device according to claim 8, wherein the determining section deletes information indicating a beam with an interference amount relative to the other wireless device exceeding a predetermined threshold from the information regarding the beam permitted to the wireless device.

10. The control device according to claim 8, wherein the determining section determines the information regarding the beam permitted to the wireless device further on a basis of a frequency access priority of each of the wireless device and the other wireless device.

11. The control device according to claim 1, wherein the notifying section notifies another control device of the information regarding the beam permitted to the wireless device, the other control device selecting another wireless device that is a destination of handover of a terminal device that communicates with the wireless device.

12. A method comprising:

acquiring first geolocation information of a datum point for interference calculation of a first wireless operation and calculating or acquiring an interference acceptable amount at the datum point;

acquiring second geolocation information, first antenna information, and first beam pattern information of a wireless device belonging to a second wireless operation that shares a portion or all of a frequency assigned to the first wireless operation; the first beam pattern information indicating a beam pattern usable by the wireless device;

determining, by a processor, information regarding a beam permitted to the wireless device on a basis of the first geolocation information and the interference acceptable amount of the datum point, and the second geolocation information, the first antenna information, and the first beam pattern information of the wireless device; and notifying the wireless device or a device related to the wireless device of the information regarding the beam permitted to the wireless device.

13. A non-transitory recording medium having a program recorded thereon, the program causing a computer to function as a first acquiring section that acquires first geolocation information of a datum point for interference calculation of a first wireless operation and calculates or acquires an interference acceptable amount at the datum point, a second acquiring section that acquires second geolocation information, first antenna information, and first beam pattern information of a wireless device belonging to a second wireless operation that shares a portion or all of a frequency assigned to the first wireless operation, the first beam pattern information indicating a beam pattern usable by the wireless device, a determining section that determines information regarding a beam permitted to the wireless device on a basis of the first geolocation information and the interference acceptable amount of the datum point, and the second geolocation information, the first antenna information, and the first beam pattern information of the wireless device, and a notifying section that notifies the wireless device or a device related to the wireless device of the information regarding the beam permitted to the wireless device.

* * * * *